(12) United States Patent
Suh et al.

(10) Patent No.: US 12,225,597 B2
(45) Date of Patent: Feb. 11, 2025

(54) SESSION AND MOBILITY MANAGEMENT METHOD USING NAS PROTOCOLS

(71) Applicant: Samsung Electronics Co., Ltd., Suwon-si (KR)

(72) Inventors: Kyungjoo Suh, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 17/608,126

(22) PCT Filed: Apr. 29, 2020

(86) PCT No.: PCT/KR2020/005801
§ 371 (c)(1),
(2) Date: Nov. 1, 2021

(87) PCT Pub. No.: WO2020/222578
PCT Pub. Date: Nov. 5, 2020

(65) Prior Publication Data
US 2022/0225438 A1 Jul. 14, 2022

(30) Foreign Application Priority Data

May 2, 2019 (KR) .................. 10-2019-0051861
May 16, 2019 (KR) .................. 10-2019-0057732

(51) Int. Cl.
*H04W 36/00* (2009.01)
*H04W 72/04* (2023.01)
(Continued)

(52) U.S. Cl.
CPC ........... *H04W 76/10* (2018.02); *H04W 72/04* (2013.01); *H04W 76/20* (2018.02); *H04W 80/10* (2013.01)

(58) Field of Classification Search
None
See application file for complete search history.

(56) References Cited

U.S. PATENT DOCUMENTS

| 11,758,397 B2 | 9/2023 | Kweon et al. |
| 2018/0270782 A1 | 9/2018 | Park et al. |
| (Continued) | | |

FOREIGN PATENT DOCUMENTS

| CN | 108702722 A | 10/2018 |
| CN | 109644133 A | 4/2019 |
| (Continued) | | |

OTHER PUBLICATIONS

European Patent Office, "Supplementary European Search Report" issued Apr. 13, 2022, in connection with European Patent Application No. 20799338.7, 10 pages.
(Continued)

*Primary Examiner* — Sithu Ko

(57) ABSTRACT

The present disclosure relates to a communication technique for managing mobility and sessions in the case of supporting multiple access of 3GPP access and non-3GPP access in a 5G communication system for supporting a data transmission rate higher than that of a 4G system, and a system therefor. The present disclosure can be applied, on the basis of 5G communication technology, to services requiring the high speed, high transmission rate, low latency, high reliability, and the like of 5G or intelligent services (e.g. smart homes, smart buildings, smart cities, smart cars or connected cars, healthcare, digital education, retail, security and safety-related services, etc.). The present disclosure discloses an efficient session and mobility management method using NAS protocols.

12 Claims, 10 Drawing Sheets

(51) Int. Cl.
    *H04W 76/10*     (2018.01)
    *H04W 76/20*     (2018.01)
    *H04W 80/10*     (2009.01)

(56) References Cited

U.S. PATENT DOCUMENTS

| | | | |
|---|---|---|---|
| 2018/0376444 | A1 | 12/2018 | Kim et al. |
| 2019/0037636 | A1 | 1/2019 | Kim et al. |
| 2019/0059067 | A1 | 2/2019 | Lee et al. |
| 2020/0015128 | A1 | 1/2020 | Stojanovski et al. |
| 2020/0178196 | A1* | 6/2020 | Wang .................... H04W 48/18 |
| 2020/0280948 | A1* | 9/2020 | Youn ..................... H04W 68/02 |
| 2020/0314701 | A1* | 10/2020 | Talebi Fard ...... H04W 36/0016 |
| 2021/0037585 | A1* | 2/2021 | Youn ..................... H04W 60/06 |
| 2021/0212021 | A1* | 7/2021 | Youn ..................... H04W 60/00 |
| 2021/0360723 | A1* | 11/2021 | Takakura ............... H04W 48/18 |
| 2022/0078871 | A1* | 3/2022 | Won ...................... H04W 76/19 |
| 2022/0167446 | A1* | 5/2022 | Youn ..................... H04W 48/16 |

FOREIGN PATENT DOCUMENTS

| | | |
|---|---|---|
| IN | 201741028350 A | 2/2019 |
| WO | 2018/231813 A1 | 12/2018 |
| WO | 2019/032972 A1 | 2/2019 |
| WO | 2019031831 A1 | 2/2019 |

OTHER PUBLICATIONS

LG Electronics: Discussion on MA PDU Session activation and synchronization, 3GPP TSG-SA WG2 Meeting #132, Xian, China, Apr. 8-12, 2019, S2-1903512, 2 pages.

Lucent Technologies: "PDP Context Activity Indication for Service Request (Service Type = Data)", 3GPP TSG CT WG1#44, Fairfax, US, Oct. 30-Nov. 3, C1-062174, 11 pages.

"3rd Generation Partnership Project; Technical Specification Group Services and System Aspects; Procedures for the 5G System; Stage 2 (Release 16)", 3GPP TS 23.502 V16.0.2 (Apr. 2019), 419 pages.

"3GPP; TSG CT; Non-Access-Stratum (NAS) protocol for 5G System (5GS)", 3GPP TS 24.501 V16.0.2 (Mar. 2019), 480 pages.

Nokia et al., "Correcting AMF behaviour for Service Request that is not integrity protected", Change Request, SA WG2 Meeting #132, Apr. 8-12, 2019, S2-1903668, 376 pages.

International Search Report dated Jul. 29, 2020 in connection with International Patent Application No. PCT/KR2020/005801, 2 pages.

Written Opinion of the International Searching Authority dated Jul. 29, 2020 in connection with International Patent Application No. PCT/KR2020/005801, 6 pages.

Office Action issued Oct. 8, 2024, in connection with Chinese Patent Application No. 202080033171.8, 32 pages.

* cited by examiner

SESSION AND MOBILITY MANAGEMENT METHOD USING NAS PROTOCOLS

CROSS-REFERENCE TO RELATED APPLICATIONS

This application is a 371 of International Application No. PCT/KR2020/005801 filed on Apr. 29, 2020, which claims priority to Korean Patent Application No. 10-2019-0051861 filed on May 2, 2019 and Korean Patent Application No. 10-2019-0057732 filed on May 16, 2019, the disclosures of which are herein incorporated by reference in their entirety.

BACKGROUND

1. Field

The disclosure relates to a method for managing a session in a next-generation 5G communication environment, and more particularly to a method of processing and managing session reactivation in a situation where mobility occurs through NAS messages, or an apparatus for performing this function.

2. Description of Related Art

To meet the ever increasing demand for wireless data traffic since the commercialization of 4G communication systems, efforts have been made to develop improved 5G or pre-5G communication systems. As such, 5G or pre-5G communication systems are also called "beyond 4G network system" or "post Long Term Evolution (LTE) system". To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), interference cancellation, and the like. Additionally, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

With the recent development of next-generation 5G communication systems, a session and mobility management method using NAS protocols is required.

With 5G mobile communication, the AMF being a management entity that manages the mobility of a terminal, and the SMF being an entity that manages sessions have been separated. Accordingly, as the entities that manage the mobility management and the session are separated, unlike the operation method managed collectively by the MME in the existing 4G LTE communication, the communication method and the communication management method between the terminal and the network entities have been changed.

With 5G communication, for non-3GPP access, mobility management is performed first by use of the N3IWF and through the AMF, and session management is performed through the SMF. In addition, mobility management is performed through the AMF, and security-related information, which is an important element in mobility management, is also dealt with.

On the other hand, in 4G, the MME is in charge of mobility management and session management, and is responsible for managing this. In addition to these 5G communication schemes, there are entities for 4G and 5G communication in 5G communication, and some 4G communication entities can be used to perform 5G communication even when the architecture configuration is of a non-standalone architecture.

Accordingly, the disclosure proposes a method that, in response to a mobility occurrence when communication is performed using non-access stratum (NAS) protocols in 5G communication, performs session activation, mobility management, and session management by using the NAS protocols, and proposes a method for improving communication performance by making mobility and session management efficient.

SUMMARY

According to an embodiment of the disclosure for achieving the above-mentioned objective, a method performed by a terminal in a wireless communication system may include: transmitting data based on a multi-access (MA) protocol data unit (PDU) session using both a 3rd generation partnership project (3GPP) access network and a non-3GPP access network; in case that user-plane resources of the MA PDU session for at least one of the 3GPP access network or the non-3GPP access network are released, transmitting a service request message including uplink data status information indicating that uplink data corresponding to an identity (ID) of the MA PDU session is pending to an entity performing an access and mobility management function (AMF) over a released access network; and receiving a service accept message including PDU session reactivation result information indicating a result of reestablishment of the user-plane resources of the MA PDU session from the entity.

Additionally, according to an embodiment of the disclosure, a method performed by an entity performing an access and mobility management function (AMF) in a wireless communication system may include: in case that user-plane resources of a multi-access (MA) protocol data unit (PDU) session for 3rd generation partnership project (3GPP) access are released, receiving a service request message including uplink data status information indicating that uplink data corresponding to the MA PDU session is pending from a terminal over the 3GPP access; and transmitting a service accept message including PDU session reactivation result information indicating a result of reestablishment of the user-plane resources of the MA PDU session to the terminal.

Additionally, according to an embodiment of the disclosure, a terminal in a wireless communication system may include: a transceiver; and a controller configured to control the transceiver to transmit data based on a multi-access (MA) protocol data unit (PDU) session using both a 3rd generation partnership project (3GPP) access network and a non-3GPP access network, control the transceiver to transmit, in case that user-plane resources of the MA PDU session for at least one of the 3GPP access network or the non-3GPP access network are released, a service request message including uplink data status information indicating that uplink data corresponding to an identity (ID) of the MA PDU session is pending to an entity performing an access and mobility management function (AMF) over a released access network, and control the transceiver to receive a service accept message including PDU session reactivation result information indicating a result of reestablishment of the user-plane resources of the MA PDU session from the entity.

In addition, according to an embodiment of the disclosure, an entity performing an access and mobility management function (AMF) in a wireless communication system may include: a transceiver; and a controller configured to control the transceiver to receive, in case that user-plane resources of a multi-access (MA) protocol data unit (PDU) session for 3rd generation partnership project (3GPP) access are released, a service request message including uplink data status information indicating that uplink data corresponding to the MA PDU session is pending from a terminal over the 3GPP access, and control the transceiver to transmit a service accept message including PDU session reactivation result information indicating a result of reestablishment of the user-plane resources of the MA PDU session to the terminal.

Through the disclosure, for 5G communication in 5G communication environments, the NAS protocols are used to manage mobility and activate a session if the session is deactivated to thereby improve communication performance, so that it is possible to efficiently perform communication.

DETAILED DESCRIPTION

Figure 1:
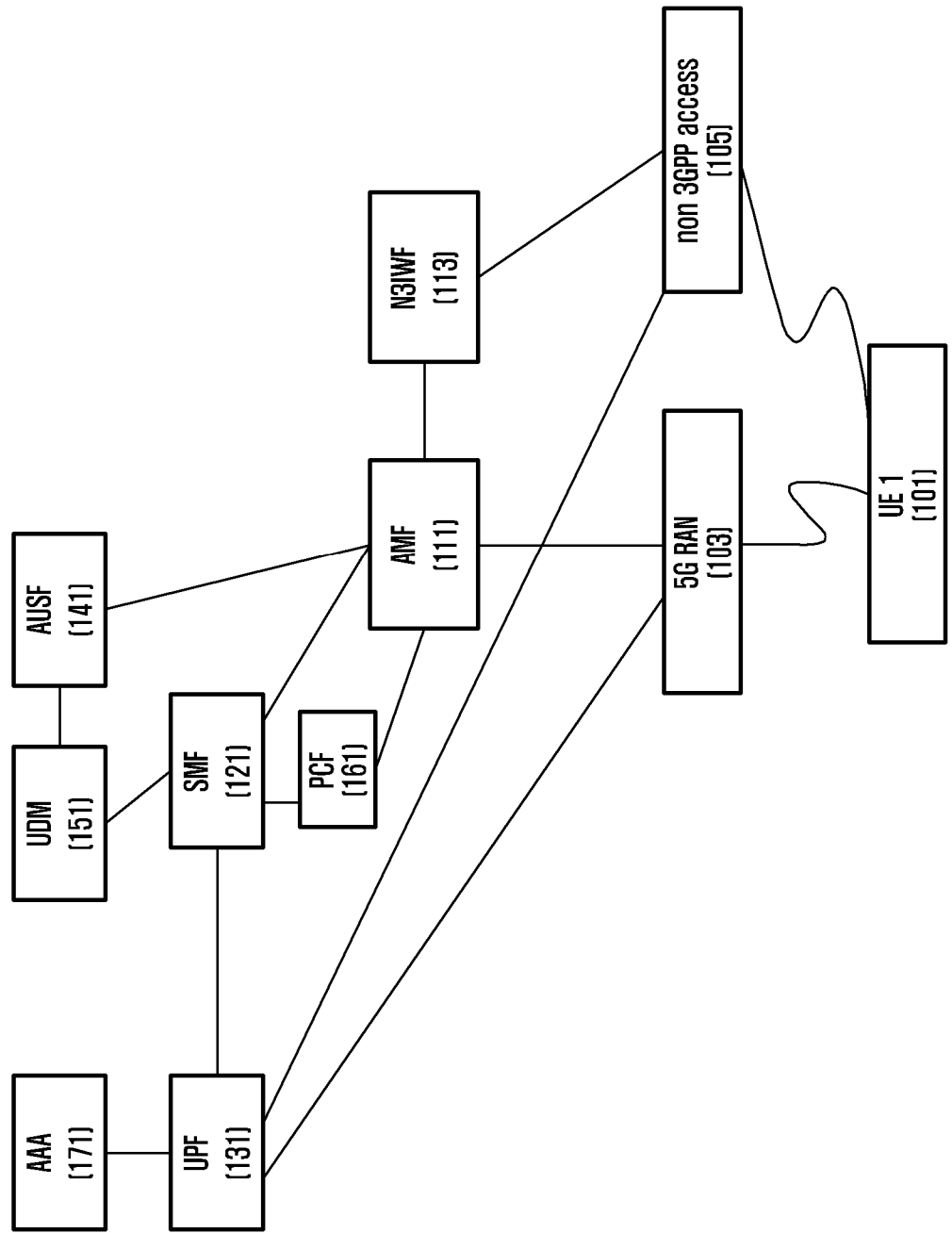
FIG. 1 illustrates an example of a terminal-network environment for performing communication with improved performance by managing mobility and activating a session by using NAS protocols in a 5G network according to an embodiment of the disclosure.

Hereinafter, exemplary embodiments of the disclosure will be described in detail with reference to the accompanying drawings. Here, it should be noted that the same components in the accompanying drawings are indicated by the same symbols as much as possible. In addition, detailed descriptions of well-known functions and configurations that may obscure the gist of the disclosure will be omitted.

In the description of embodiments of the present specification, descriptions of technical details well known in the art and not directly related to the disclosure may be omitted. This is to more clearly convey the gist of the disclosure without obscurities by omitting unnecessary descriptions.

Likewise, in the drawings, some elements are exaggerated, omitted, or only outlined in brief. Also, the size of each element does not necessarily reflect the actual size. The same reference symbols are used throughout the drawings to refer to the same or corresponding parts. In each figure, the same or corresponding elements are assigned the same reference numerals.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, and the embodiments are provided only to complete the disclosure and to fully inform the scope of the disclosure to those skilled in the art to which the disclosure pertains. The same reference symbols are used throughout the specification to refer to the same parts.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, the disclosure uses terms and names defined in the standards for 5G and LTE systems. However, the disclosure is not limited by the above terms and names, and can be equally applied to systems conforming to other standards.

That is, in the detailed description of the embodiments of the disclosure, the communication standards set by 3GPP will be focused, but it should be understood by those skilled in the art that the subject matter of the disclosure is applicable to other communication systems having similar technical backgrounds without significant modifications departing from the scope of the disclosure.

First Embodiment

FIG. 1 illustrates an example of a terminal-network environment for performing communication with improved performance by managing mobility and activating a session by using NAS protocols in a 5G network according to an embodiment of the disclosure.

In an embodiment of the disclosure, assuming a 5G network, it is considered that the user plane function (UPF), the session management function (SMF), the access and mobility management function (AMF), the 5G radio access network (5G RAN), the user data management (UDM), and the policy control function (PCF) constitute a network system. Meanwhile, for authentication of these entities, it is also considered that the authentication server function (AUSF), and the authentication, authorization and accounting (AAA) exist in the system.

On the other hand, the N3 interworking function (N3IWF) exists for the case where the terminal communicates through non-3GPP access, and, when communicating through non-3GPP access, session control is performed in the terminal, non-3GPP access, N3IWF, and SMF for session management, and mobility control occurs in the terminal, non-3GPP access, N3IWF, and AMF for mobility management.

In 5G, the mobility management and session management entity is separated into the AMF and SMF. On the other hand, for 5G communication, not only a standalone deployment structure where communication is performed using only 5G communication entities but also a non-standalone deployment structure using 4G and 5G entities is being considered.

Although the communication network on which the disclosure is based is assumed to be 5G and 4G LTE networks, it can be applied if the same concept is applied to other systems within a range that can be understood by a person of ordinary skill in the art.

(Method 1)

Figure 2:
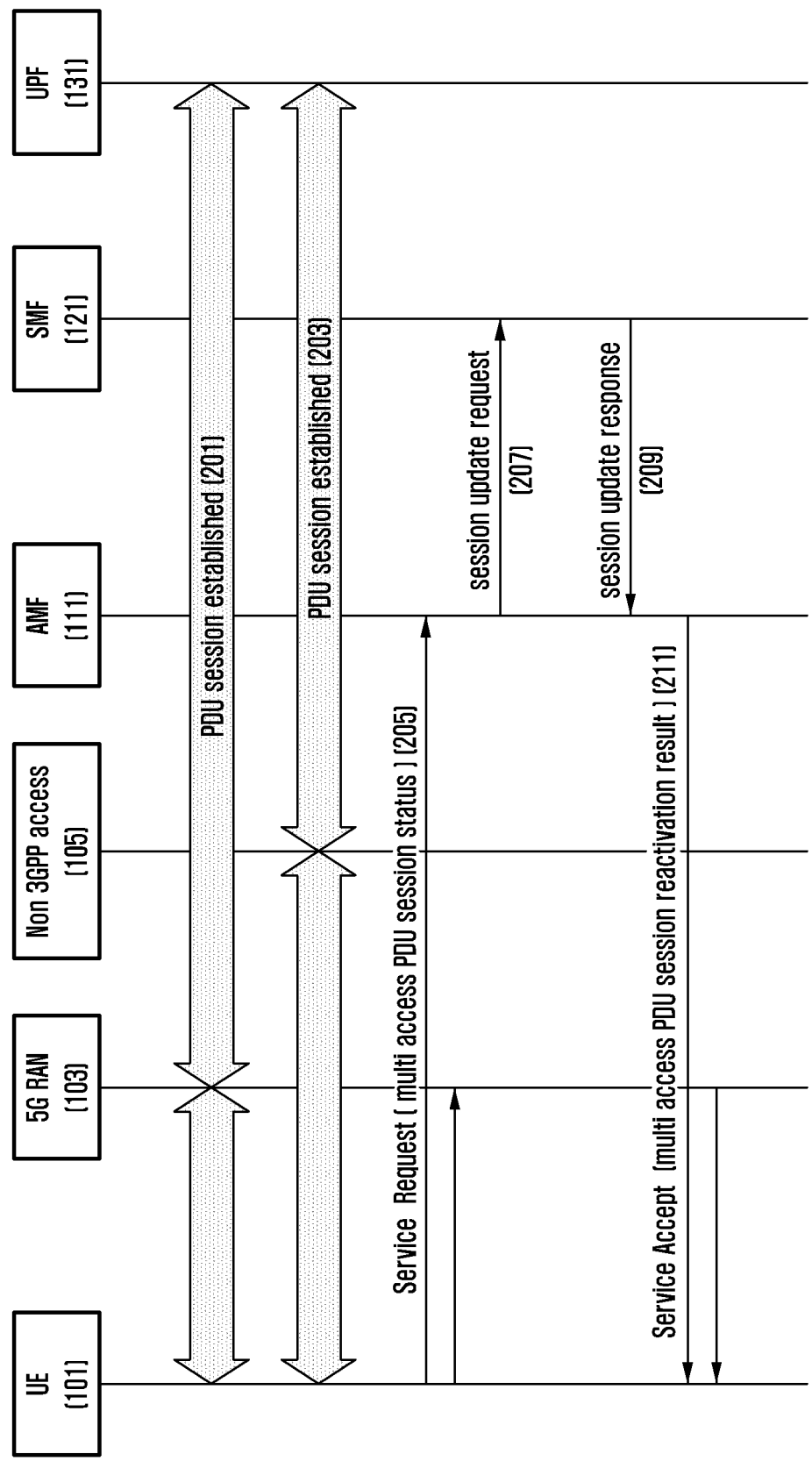
FIG. 2 illustrates an embodiment of a communication procedure and method for mobility management and session activation through NAS protocols in a 5G network environment according to an embodiment of the disclosure.

FIG. 2 illustrates an embodiment of a communication procedure and method for mobility management and session activation through NAS protocols in a 5G network environment according to an embodiment of the disclosure.

At step 201, the UE has established a PDU session with the UPF to communicate. Here, the PDU session has been established through the 5G RAN; that is, data communication is being performed through the UE, 5G RAN and UPF.

At step 203, the terminal has established a PDU session with the UPF to communicate. In this case, the PDU session has been established through non-3GPP access, for example, WiFi, trusted WiFi, or non-trusted WiFi; that is, data communication is being performed through the UE, non-3GPP access and UPF.

At step 205, the UE transmits a service request to the AMF. Here, the UE may transmit a service request to the AMF through 3GPP access. In another embodiment, the UE may transmit a service request to the AMF through non-3GPP access. In this case, the status of the multi-access PDU session may be informed to the AMF through a multi-access PDU session status information element.

This multi-access PDU session status information element is configured as shown in Table 1. In addition, the multi-access PDU session status information can be coded and interpreted as shown in Table 2.

TABLE 1

| 8 | 7 | 6 | 5 | 4 | 3 | 2 | 1 | |
|---|---|---|---|---|---|---|---|---|
| Multi access PDU session status |E| | | | | | | | | octet 1 |
| Length of multi access PDU session status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare | | | | | | | | octet 5*-34* |

TABLE 2

PSI(x) shall be coded as follows.

PSI(0):

Bit 1 of octet 3 is spare and shall be coded as zero

PSI(1) - PSI(15):

0 indicates that the 5GSM state of the corresponding multi access PDU session is multi access PDU

SESSION INACTIVE 1 indicates that the 5GSM state of the corresponding multi access PDU session is multi access PDU

SESSION ACTIVE

All bits in octet 5 to 34 are spare and shall be coded as zero, if the respective octets is included in the information element In addition, this multi-access PDU session status information element is an information element included in the service request message as shown in Table 3.

TABLE 3

| IEI | Information Element | Type/Reference | Presence | Format | Length |
|---|---|---|---|---|---|
|  | Extended protocol discriminator | Extended protocol discriminator 9.2 | M | V | 1 |
|  | Security header type | Security header type 9.3 | M | V | 1/2 |
|  | Spare half octet | Spare half octet 9.5 | M | V | 1/2 |
|  | Service request message identity | Message type 9.7 | M | V | 1 |
|  | ngKSI | NAS key set identifier 9.11.3.32 | M | V | 1/2 |
|  | Service type | Service type 9.11.3.50 | M | V | 1/2 |
|  | 5G-S-TMSI | 5GS mobile identity 9.11.3.4 | M | LV-E | 9 |
| 40 | Uplink data status | Uplink data status 9.11.3.57 | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |
|  | Multi access PDU session status | Multi access PDU session status | O | TLV | 4-34 |

At step 207, the AMF transmits a PDU session update request message to the SMF.

At step 209, the SMF transmits a PDU session update response message to the AMF.

At step 211, the AMF transmits a service accept message to the UE as shown in Table 4.

TABLE 4

| IEI | Information Element | Type/Reference | Presence | Format | Length |
|---|---|---|---|---|---|
|  | Extended protocol discriminator | Extended protocol discriminator 9.2 | M | V | 1 |
|  | Security header type | Security header type 9.3 | M | V | 1/2 |
|  | Spare half octet | Spare half octet 9.5 | M | V | 1/2 |
|  | Service accept message identity | Message type 9.7 | M | V | 1 |
| 50 | PDU session status | PDU session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |
| 78 | EAP message | EAP message 9.11.2.2 | O | TLV-E | 7-1503 |
|  | Multi access PDU session reactivation result | Multi access PDU session reactivation result | O | TLV-E | 4-34 |
|  | Multi access PDU session reactivation result error cause | Multi access PDU session reactivation result error cause | O | TLV-E | 5-515 |

Here, a multi-access PDU session reactivation result may be transmitted to inform information about the result of the multi-access PDU session activation requested in the service request. This information may be transmitted by being included in the multi-access PDU session reactivation result information element as shown in Table 5 included in the service accept message at step 211. The information element in Table 5 is coded and interpreted as in Table 6.

TABLE 5

| 8 | 7 | 6 | 5 | 4 | 3 | 2 | 1 | |
|---|---|---|---|---|---|---|---|---|
| Multi access PDU session reactvaton result IEI ||||||||  octet 1 |
| Length of multi access PDU session reactivation result contents |||||||| octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare |||||||| octet5*-34* |

TABLE 6

PSI(x) shall be coded as follows:
PSI(0):
Bit 0 of octet 3 is spare and shall be coded as zero.
PSI(1) - PSI(15):
0   indicates establishment of user-plane resources of the multi access PDU session was not allowed in the multi access PDU session reactivation status IE or establishment of user-plane resource of the PDU session is successful.
1   indicates establishment of user-plane resources of the PDU session was requested in the multi access PDU session status IE but establishment of user-plane resource of the multi access PDU session is either not performed or not successful.
All bits in octet 5 to 34 are spare and shall be coded as zero, if the respective octet is included in the information element.

Additionally, at this time, to inform information about an error occurrence together with the result of the multi-access PDU session activation requested in the service request, information about the error is included in the multi-access PDU session reactivation result error cause information element as shown in Table 7 and transmitted. This multi-access PDU session reactivation result error cause information element is transmitted by being included in the service accept message at step 211. Coding and interpretation for Table 7 are shown in Table 8. That is, it is possible to notify various causes (reasons) given in the 5GMM cause information element, such as insufficient resource for a PDU session, insufficient resource for a specific DNN or slice, or insufficient resource for a specific slice.

TABLE 7

| 8 | 7 | 6 | 5 | 4 | 3 | 2 | 1 | |
|---|---|---|---|---|---|---|---|---|
| Multi access PDU session reactivation result error cause |E| | | | | | | | | octet 1 |
| Length of multi access PDU session reactivation result error cause | | | | | | | | octet 2 |
| | | | | | | | | octet 3 |
| PDU session ID | | | | | | | | octet 4 |
| cause value | | | | | | | | octet 5 |
| ... | | | | | | | | |
| PDU session ID | | | | | | | | octet 514* |
| cause value | | | | | | | | octet 515* |

TABLE 8

PDU session is coded same as PDU session ID IE

The cause value coded same as second octet of 5GMM cause information element

Alternatively, as another embodiment, there may be a method in which the AMF informs the UE of the result of multiple access PDU session reactivation by utilizing the existing PDU session reactivation result IE (information element). When using the existing PDU session reactivation result IE (information element), an information element notifying the UE that the AMF supports a multiple access PDU session or multiple access PDU session reactivation may be added.

The configuration of such multiple access PDU session or multiple access PDU session reactivation supporting indication IE (information element) is shown in Table 9 below, and the interpretation and coding thereof are shown in Table 9-1.

TABLE 9

| 8 | 7 | 6 | 5 | 4 | 3 | 2 | 1 | |
|---|---|---|---|---|---|---|---|---|
| Multiple access PD session supporting indication |E| | | | 0 Spare | 0 Spare | 0 Spare | Multiple Multiple access PDU session supporting | | octet 1 |

TABLE 9-1

| Multiple access PDU session supporting Indication (octet 1) Bit 1 0 Multiple access PDU session is not supported 1 Multiple access PDU session is supported. Bits 2, 3 and 4 are spare and shall be coded as zero. |
|---|

In addition, information about the access type that indicates the access at which reactivation has occurred or an error or problem has occurred may be added.

(Method 2)

Figure 3:
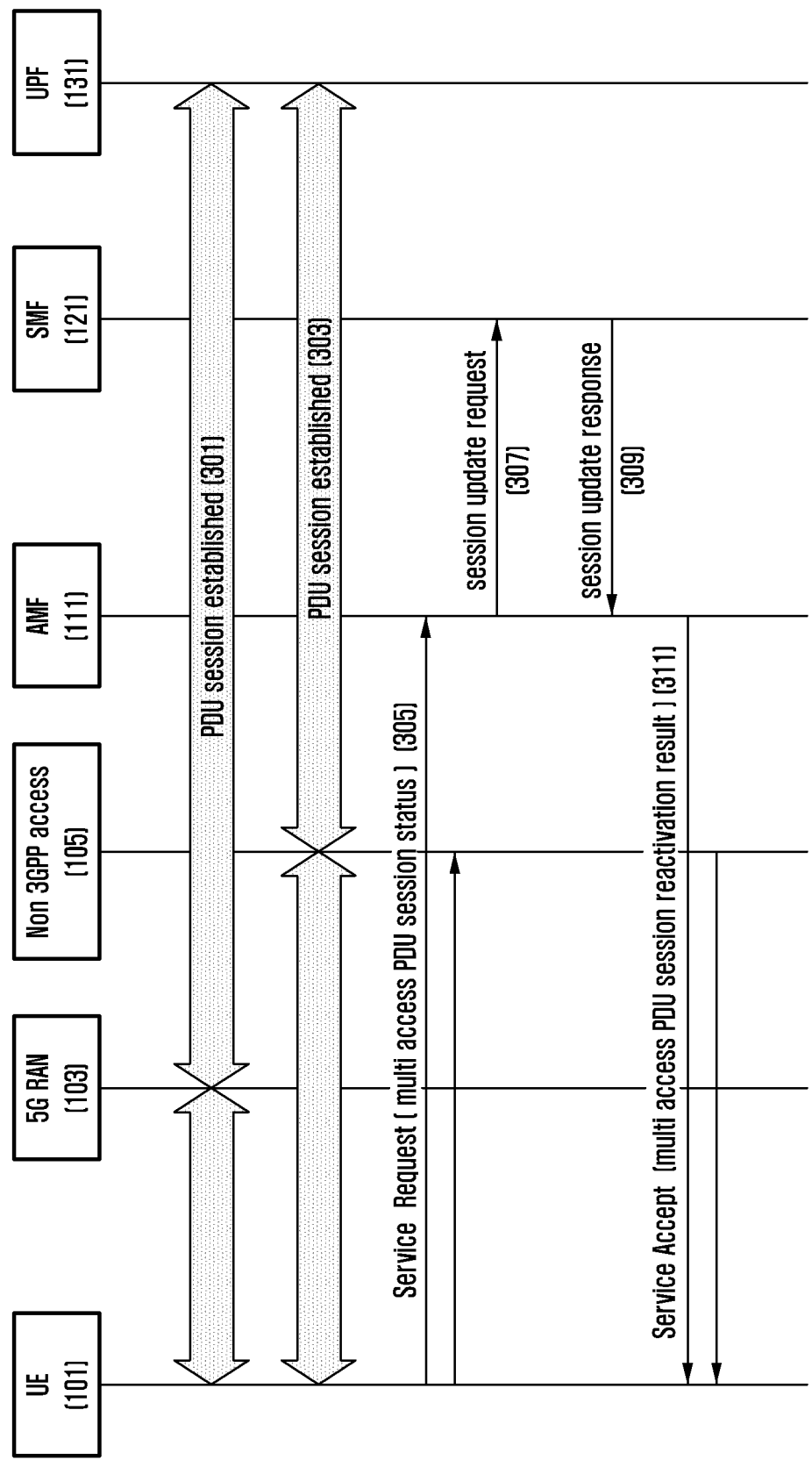
FIG. 3 illustrates an embodiment of a communication procedure and method for mobility management and session activation through NAS protocols in a 5G network environment according to an embodiment of the disclosure.

FIG. 3 illustrates an embodiment of a communication procedure and method for mobility management and session activation through NAS protocols in a 5G network environment according to an embodiment of the disclosure.

At step 301, the UE has established a PDU session with the UPF to communicate. Here, the PDU session has been established through the 5G RAN; that is, data communication is being performed through the UE, 5G RAN and UPF.

At step 303, the UE has established a PDU session with the UPF to communicate. In this case, the PDU session has been established through non-3GPP access, for example, WiFi, trusted WiFi, or non-trusted WiFi; that is, data communication is being performed through the UE, non-3GPP access and UPF.

At step 305, the UE transmits a service request to the AMF. Here, the UE may transmit a service request to the AMF through non-3GPP access. In this case, the status of the multi-access PDU session may be informed to the AMF through a multi-access PDU session status information element.

FIG. 3 illustrates a case of executing a service request through non-3GPP access, and illustrates a case where the session can be recovered when the service request is sent through non-3GPP access but the access situation has changed from before. That is, for example, when 70% of the flow has been sent through 3GPP and 30% has been sent through non-3GPP before the service request, and when 80% of the flow is sent through 3GPP and 20% is sent through non-3GPP after the service request, such information may be notified by using this method.

In another embodiment, when an attempt to reactivate the session through a service request over non-3GPP access has failed due to a failure of RRC connection reestablishment, it is also possible to transfer all of the flow that has been transmitted over non-3GPP access to 3GPP access. In such a case, that is, when non-3GPP access is not recovered, all flows for these PDU sessions are transferred to 3GPP access to continue communication.

This multi-access PDU session status information element is configured as shown in Table 11. And, multi-access PDU session status information can be coded and interpreted as shown in Table 12.

TABLE 11

| 8 | 7 | 6 | 5 | 4 | 3 | 2 | 1 | |
|---|---|---|---|---|---|---|---|---|
| Multi access PDU session status |E| | | | | | | | | octet 1 |
| Length of multi access PDU session status contents | | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare | | | | | | | | octet 5*-34* |

TABLE 12

| PSI(x) shall be coded as follows: PSI(0): Bit 1 of octet 3 is spare and shall he coded as zero. PSI(1)-PSI(15): 0    indicates that the 5GSM state of the correspoinding multi access PDU session is multi access PDU SESSION INACTIVE 1    indicates that the 5GSM state of the correspoinding multi access PDU session is multi access PDU SESSION ACTIVE All bits in octet 5 to 34 are spare and shall be coded as zero, if the respective octet is included in the information element. |
|---|

In addition, this multi-access PDU session status information element is an information element included in the service request message as shown in Table 13.

TABLE 13

| IEI | Information Element | Type/Reference | Presence | Format | Length |
|---|---|---|---|---|---|
| | Extended protocol discriminator | Extended protocol discriminator 9.2 | M | V | 1 |
| | Security header Type | Security header Type 9.3 | M | V | 1/2 |
| | Spare half octet | Spare half octet 9.5 | M | V | 1/2 |
| | Service request message identity | Message type 9.7 | M | V | 1 |
| | ngKSI | NAS key set identifier 9.11.3.32 | M | V | 1/2 |
| | Service type | Service type 9.11.3.50 | M | V | 1/2 |
| | 5G-S-TMSI | 5GS mobile identity 9.11.3.4 | M | LV-E | 9 |
| 40 | Uplink data status | Uplink data status 9.11.3.57 | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |
| | Multi access PDU session status | Multi access PDU session status | O | TLV | 4-34 |

At step 307, the AMF transmits a PDU session update request message to the SMF.

At step 309, the SMF transmits a PDU session update response message to the AMF.

At step 311, the AMF transmits a service accept message to the UE as shown in Table 14.

TABLE 14

| IEI | Information Element | Type/Reference | Presence | Format | Length |
|---|---|---|---|---|---|
| | Extended prtocol discriminator | Extended protocol discriminator 9.2 | M | V | 1 |
| | Security header type | Security header type 9.3 | M | V | 1/2 |
| | Spare halt octet | Spare half octet 9.5. | M | V | 1/2 |
| | Service accept message identity | Message type 9.7 | M | V | 1 |
| 50 | PDU session status | PDU Session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |

TABLE 14-continued

| IEI | Information Element | Type/Reference | Presence | Format | Length |
|---|---|---|---|---|---|
| 78 | EAP message | EAP message 9.11.2.2. | O | TLV-E | 7-1503 |
| | Multi access PDU session reactivation result | Multi access PDU session activation result | O | TLV-E | 4-34 |
| | Multi access PDU session reactivation result error cause | Multi access PDU session reactivation result error cause | O | TLV-E | 5-515 |

Here, a multi-access PDU session reactivation result may be transmitted to inform information about the result of the multi-access PDU session activation requested in the service request. This information may be transmitted by being included in the multi-access PDU session reactivation result information element as shown in Table 15 included in the service accept message at step 311.

The information element in Table 15 is coded and interpreted as in Table 16.

TABLE 15

| 8 | 7 | 6 | 5 | 4 | 3 | 2 | 1 | |
|---|---|---|---|---|---|---|---|---|
| Multi access PDU session reactivation result |E| | | | | | | | | octet 1 |
| Length of multi access PDU session reactivaton result contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| | | | | spare | | | | octet 5*-34 |

TABLE 16

PSI(x) shall be coded as follows:
PSI(0):
Bit 0 of octet 3 is spare and shall be coded as zero.
PSI(1) - PSI(15):
0  indicates establishment of user-plane resources of the multi access PDU session was not allowed in
the multi access PDU session reactivation status IE or establishment of user-plane resource of the PDU session is
successful.
1  indicates establishment of user-plane resources of the PDU session was requested in the multi access
PDU session status IE but establishment of user-plane resource of the multi access PDU session is either not
performed or not successful.
All bits in octet 5 to 34 are spare and shall be coded as zero, if the respective octet is included in the information
element.

Additionally, at this time, to inform information about an error occurrence together with the result of the multi-access PDU session activation requested in the service request, information about the error may be included in the multi-access PDU session reactivation result error cause information element as shown in Table 17 and transmitted. This multi-access PDU session reactivation result error cause information element may be transmitted by being included in the service accept message at step 311.

Coding and interpretation for Table 17 are shown in Table 18.

That is, it is possible to notify various causes (reasons) given in the 5GMM cause information element, such as insufficient resource for a PDU session, insufficient resource for a specific DNN or slice, or insufficient resource for a specific slice.

TABLE 17

| 8 | 7 | 6 | 5 | 4 | 3 | 2 | 1 | |
|---|---|---|---|---|---|---|---|---|
| Multi access PDU session reactivation result error cause \|E\| | | | | | | | | octet 1 |
| Length of multi access PDU session reactivation result error cause | | | | | | | | octet 2 |
| | | | | | | | | octet 3 |
| PDU session ID | | | | | | | | octet 4 |
| cause value | | | | | | | | octet 5 |
| ... | | | | | | | | |
| PDU session ID | | | | | | | | octet 514* |
| cause value | | | | | | | | octet 515* |

TABLE 18

PDU session ID is coded same as PDU session ID IE
The cause value is coded same as second octet of 5GMM cause information element Alternatively, as another embodiment, there may be a method in which the AMF informs the UE of the result of multiple access PDU session reactivation by utilizing the existing PDU session reactivation result IE (information element). When using the existing PDU session reactivation result IE (information element), an information element notifying the UE that the AMF supports a multiple access PDU session or multiple access PDU session reactivation may be added.

The configuration of such multiple access PDU session or multiple access PDU session reactivation supporting indication IE (information element) is shown in Table 19 below, and the interpretation and coding thereof are shown in Table 19-1.

TABLE 19

| 8 | 7 | 6 | 5 | 4 | 3 | 2 | 1 | |
|---|---|---|---|---|---|---|---|---|
| Multiple access PDU session supporting indication \|E\| | | 0 Spare | 0 Spare | 0 Spare | | Multiple Multiple access PDU session supporting | | octet 1 |

TABLE 19-1

Multiple access PDU session supporting Indication (octet 1)
Bit
1
0    Multiple access PDU session is not supported
1    Multiple access PDU session is supported.
Bits 2, 3 and 4 are spare and shall be coded as zero In addition, information about the access type that indicates the access at which reactivation has occurred or an error or problem has occurred may be added.

(Method 3)

Figure 4:
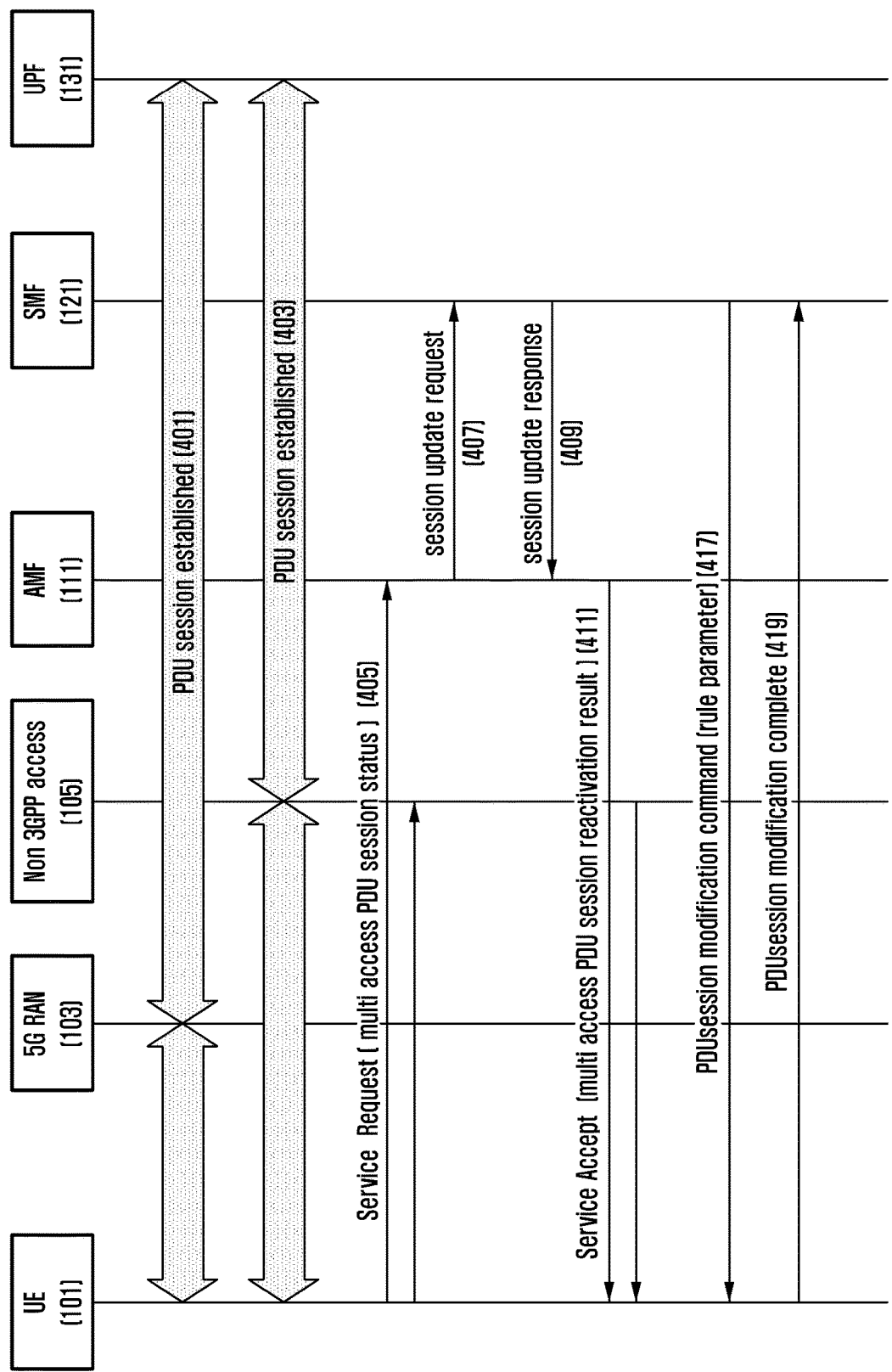
FIG. 4 illustrates an embodiment of a communication procedure and method for mobility management and session activation through NAS protocols in a 5G network environment according to an embodiment of the disclosure.

FIG. 4 illustrates an embodiment of a communication procedure and method for mobility management and session activation through NAS protocols in a 5G network environment according to an embodiment of the disclosure.

At step 401, the terminal has established a PDU session with the UPF to communicate. Here, the PDU session has been established through the 5G RAN; that is, data communication is being performed through the terminal, 5G RAN and UPF.

At step 403, the terminal has established a PDU session with the UPF to communicate. In this case, the PDU session has been established through non-3GPP access, for example, WiFi, trusted WiFi, or non-trusted WiFi; that is, data communication is being performed through the terminal, non-3GPP access and UPF.

At step 405, the terminal transmits a service request to the AMF. Here, the terminal may transmit a service request to the AMF through 3GPP access. In another embodiment, the terminal may transmit a service request to the AMF through non-3GPP access. Here, the status of the multi-access PDU session may be informed to the AMF through a multi-access PDU session status information element.

FIG. 4 illustrates a case of executing a service request through non-3GPP access, and illustrates a case where the session can be recovered when the service request is sent through non-3GPP access but the access situation has changed from before. That is, for example, when 70% of the flow has been sent through 3GPP and 30% has been sent through non-3GPP before the service request, and when 80% of the flow is sent through 3GPP and 20% is sent through non-3GPP after the service request, such information may be notified by using this method.

In this case, after the service accept, parameters related to the multiple access PDU session may be changed through a PDU session modification command as at steps 417 and 419, and accordingly, it is possible to adjust the transmission rates or ratios of the flows transmitted for the corresponding PDU session.

This multi-access PDU session status information element is configured as shown in Table 21. And, multi-access PDU session status information can be coded and interpreted as shown in Table 22.

TABLE 21

| 8 | 7 | 6 | 5 | 4 | 3 | 2 | 1 | |
|---|---|---|---|---|---|---|---|---|
| Multi access PDU session status IEI | | | | | | | | octet 1 |
| Length of multi access PDU session status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare | | | | | | | | octet 5*-34* |

TABLE 22

PSI(x) shall be coded as follows:
PSI(0):
Bit 1 of octet 3 is spare and shall he coded as zero.
PSI(1)-PSI(15):
0    indicates that the 5GSM state of the correspoinding multi access PDU session is multi access PDU SESSION INACTIVE TABLE 22-continued 1    indicates that the 5GSM state of the correspoinding multi access PDU session is multi access PDU SESSION ACTIVE
All bits in octet 5 to 34 are spare and shall be coded as zero, if the respective octet is included in the information element.

In addition, this multi-access PDU session status information element is an information element included in the service request message as shown in Table 23.

TABLE 23

| IEI | Information Element | Type/Reference | Presence | Format | Length |
|---|---|---|---|---|---|
| | Extended protocol discriminator | Extended protocol discriminator 9.2 | M | V | 1 |
| | Security header Type | Security header Type 9.3 | M | V | 1/2 |
| | Spare half octet | Spare half octet 9.5 | M | V | 1/2 |
| | Service request message identity | Message type 9.7 | M | V | 1 |
| | ngKSI | NAS key set identifier 9.11.3.32 | M | V | 1/2 |
| | Service type | Service type 9.11.3.50 | M | V | 1/2 |
| | 5G-S-TMSI | 5GS mobile identity 9.11.3.4 | M | LV-E | 9 |
| 40 | Uplink data status | Uplink data status 9.11.3.57 | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |
| | Multi access PDU session status | Multi access PDU session status | O | TLV | 4-34 |

At step 407, the AMF transmits a PDU session update request message to the SMF.

At step 409, the SMF transmits a PDU session update response message to the AMF.

At step 411, the AMF transmits a service accept message to the terminal as shown in Table 24.

TABLE 24

| IEI | Information Element | Type/Reference | Presence | Format | Length |
|---|---|---|---|---|---|
| | Extended prtocol discriminator | Extended protocol discriminator 9.2 | M | V | 1 |
| | Security header type | Security header type 9.3 | M | V | 1/2 |
| | Spare halt octet | Spare half octet 9.5. | M | V | 1/2 |
| | Service accept message identity | Message type 9.7 | M | V | 1 |
| 50 | PDU session status | PDU Session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |
| 78 | EAP message | EAP message 9.11.2.2. | O | TLV-E | 7-1503 |

TABLE 24-continued

| IEI | Information Element | Type/Reference | Presence | Format | Length |
|---|---|---|---|---|---|
| | Multi access PDU session reactivation result | Multi access PDU session activation result | O | TLV-E | 4-34 |
| | Multi access PDU session reactivation result error cause | Multi access PDU session reactivation result error cause | O | TLV-E | 5-515 |

Here, a multi-access PDU session reactivation result may be transmitted to inform information about the result of the multi-access PDU session activation requested in the service request. This information may be transmitted by being included in the multi-access PDU session reactivation result information element as shown in Table 25 included in the service accept message at step 411.

The information element in Table 25 is coded and interpreted as in Table 26.

TABLE 25

| 8 | 7 | 6 | 5 | 4 | 3 | 2 | 1 | |
|---|---|---|---|---|---|---|---|---|
| Multi access PDU session reactivation result |E| | | | | | | | | octet 1 |
| Length of multi access PDU session reactivation result contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | octet 5*-34* |
| | | | | spare | | | | |

TABLE 26

PSI(x) shall be coded as follows:
PSI(0):
Bit 0 of octet 3 is spare and shall be coded as zero.
PSI(1)-PSI(15):
0    indicates establishment of user-plane resources of the multi access PDU session was not allowed in the multi acess PDU session reactivation status IE or establishment of user-plane resource of the PDU session is successful.
1    indicates establishment of user plane resources of the PDU session was requested in the multi access PDU session status IE but establishment of user-plane resource of the multi access PDU session is either not performed or not successful
All bits in octet 5 to 34 are spare and shall be coded as zero, if the respective octet is included in the information element.

Additionally, at this time, to inform information about an error occurrence together with the result of the multi-access PDU session activation requested in the service request, information about the error may be included in the multi-access PDU session reactivation result error cause information element as shown in Table 27 and transmitted. This multi-access PDU session reactivation result error cause information element may be transmitted by being included in the service accept message at step 411.

Coding and interpretation for Table 27 are shown in Table 28.

That is, it is possible to notify various causes (reasons) given in the 5GMM cause information element, such as insufficient resource for a PDU session, insufficient resource for a specific DNN or slice, or insufficient resource for a specific slice.

TABLE 27

| 8 | 7 | 6 | 5 | 4 | 3 | 2 | 1 | |
|---|---|---|---|---|---|---|---|---|
| Multi access PDU session reactivation result error cause |E| | | | | | | | | octet 1 |
| Length of multi access PDU session reactivation result error cause | | | | | | | | octet 2 |
| | | | | | | | | octet 3 |
| PDU session ID | | | | | | | | octet 4 |
| cause value | | | | | | | | octet 5 |
| ... | | | | | | | | |
| PDU session ID | | | | | | | | octet 514* |
| cause value | | | | | | | | octet 515* |

TABLE 28

PDU session ID is coded same as PDU session ID IE
The cause value is coded same as second octet of 5GMM cause
information element Alternatively, as another embodiment, there may be a method in which the AMF informs the terminal of the result of multiple access PDU session reactivation by utilizing the existing PDU session reactivation result IE (information element). When using the existing PDU session reactivation result IE (information element), an information element notifying the terminal that the AMF supports a multiple access PDU session or multiple access PDU session reactivation may be added.

The configuration of such multiple access PDU session or multiple access PDU session reactivation supporting indication IE (information element) is shown in Table 28-1 below, and the interpretation and coding thereof are shown in Table 28-2.

TABLE 28-1

| 8 | 7 | 6 | 5 | 4 | 3 | 2 | 1 | |
|---|---|---|---|---|---|---|---|---|
| Multiple access PDU session supporting indication |E| | | 0 Spare | 0 Spare | 0 Spare | Multiple Multiple access PDU session supporting | | | octet 1 |

TABLE 28-2

Multiple access PDU session supporting Indication (octet 1)
Bit
1
0   Multiple access PDU session is not supported
1   Multiple access PDU session is supported.
Bits 2, 3 and 4 are spare and shall be coded as zero.

In addition, information about the access type that indicates the access at which reactivation has occurred or an error or problem has occurred may be added.

At step 417, the SMF transmits a PDU session modification command to the terminal. At this time, information related to the multi-access PDU session, for example, parameters related to a multiple access PDU session parameter container may be transmitted, and the multiple access PDU session parameter container may include information such as multiple access PDU session related rules, an IP address and port number of the multi-path TCP (MPTCP) proxy, and a UE link specific address.

TABLE 29

PDU session modification command

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session Identity 9.4 | M | V | 1 |
| | PTI | Procedure transaction identity 9.6 | M | V | 1 |
| | PDU SESSION MODIFICATION COMMAND message identity | Message type 9.7 | M | V | 1 |
| 59 | 5GSM cause | 5GSM cause 9.11.4.2 | O | TV | 2 |

TABLE 29-continued

PDU session modification command

| IEI | Information Element | Type/Reference | Presence | Format | Length |
|---|---|---|---|---|---|
| 2A | Session AMBR | Session-AMBR 9.11.4.14 | O | TLV | 8 |
| 56 | RQ timer value | GPRS time 9.11.2.3 | O | TV | 2 |
| 8- | Always-on PDU session indication | Always-on PDU session indication 9.11.4 3 | O | TV | 1 |
| 7A | Authorized QoS rules | QoS rules 9.11.4.13 | O | TLV-E | 7-65538 |
| 75 | Mapped EPS bearer contexts | Mapped EPS bearer context 9.11.4.8 | O | TLV-E | 7-65538 |
| 79 | Authorized QoS flow descriptions | QoS flow descriptions 9.11.4.12 | O | TLV-E | 6-65538 |

TABLE 29-continued

PDU session modification command

| IEI | Information Element | Type/Reference | Presence | Format | Length |
|---|---|---|---|---|---|
| 7B | Extended protocol configuration options | Extended protocol configuration options 9.11.4.6 | O | TLV-E | 4-65538 |
| | Multiple access PDU session parameter container | Multiple access PDU session parameter container | O | TLV-E | 3-65538 |

At step 419, the terminal transmits a PDU session modification complete message to the SMF.

(Method 4)

Figure 5:
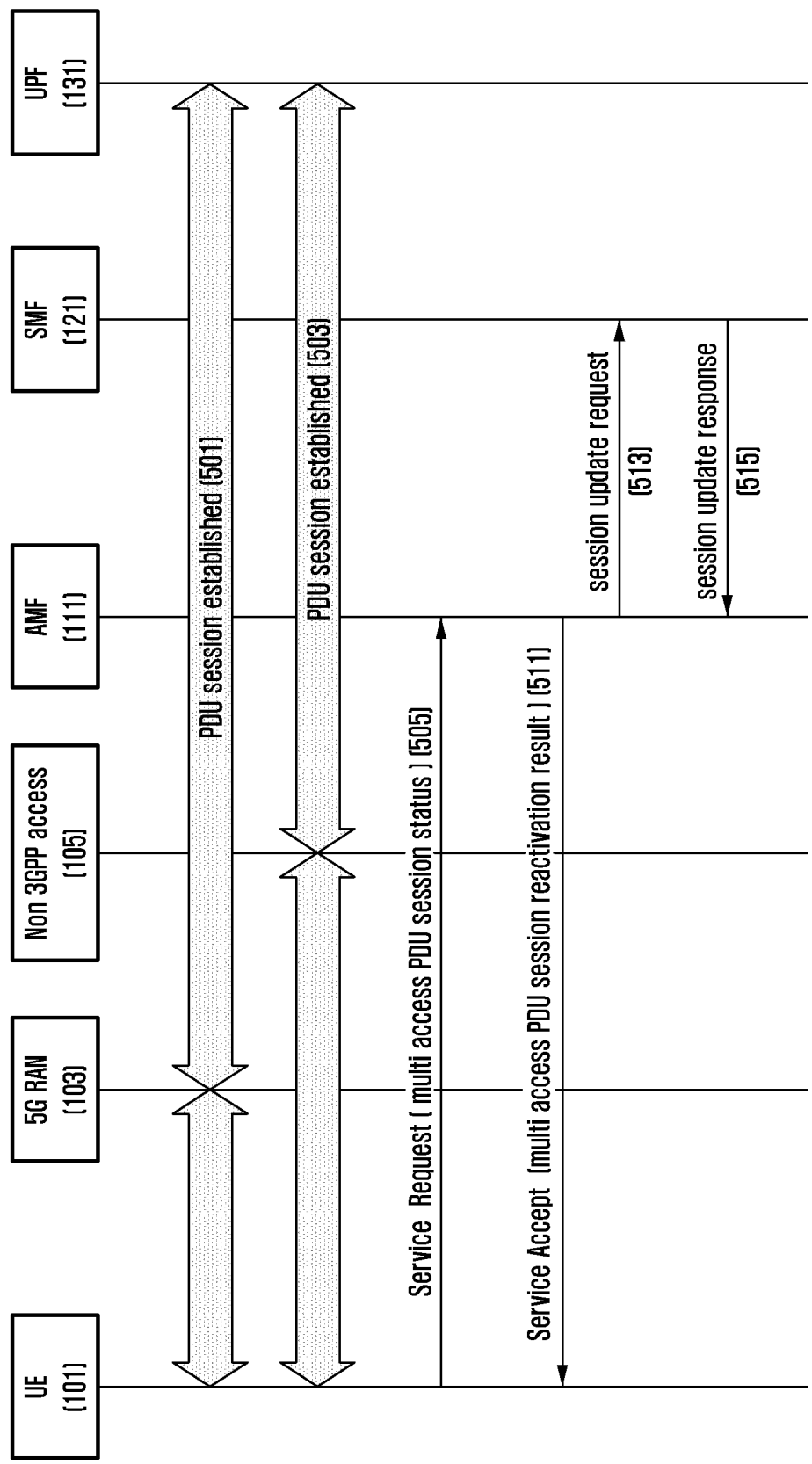
FIG. 5 illustrates an embodiment of a communication procedure and method for mobility management and session activation through NAS protocols in a 5G network environment according to an embodiment of the disclosure.

FIG. 5 illustrates an embodiment of a communication procedure and method for mobility management and session activation through NAS protocols in a 5G network environment according to an embodiment of the disclosure.

At step 501, the UE has established a PDU session with the UPF to communicate. Here, the PDU session has been established through the 5G RAN; that is, data communication is being performed through the UE, 5G RAN and UPF.

At step 503, the UE has established a PDU session with the UPF to communicate. In this case, the PDU session has been established through non-3GPP access, for example, WiFi, trusted WiFi, or non-trusted WiFi; that is, data communication is being performed through the UE, non-3GPP access and UPF.

At step 505, the UE transmits a service request to the AMF. Here, the UE may transmit a service request to the AMF through 3GPP access. In another embodiment, the UE may transmit a service request to the AMF through non-3GPP access. Here, the status of the multi-access PDU session may be informed to the AMF through a multi-access PDU session status information element.

This multi-access PDU session status information element is configured as shown in Table 31. And, multi-access PDU session status information can be coded and interpreted as shown in Table 32.

TABLE 31

| 8 | 7 | 6 | 5 | 4 | 3 | 2 | 1 | |
|---|---|---|---|---|---|---|---|---|
| Multi access PDU session status IEI | | | | | | | | octet 1 |
| Length of multi access PDU session status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | octet 5*-34* |
| | | | spare | | | | | |

TABLE 32

PSI(x) shall be coded as follows.
PSI(0):
Bit 1 of octet 3 is spare and shall be coded as zero
PSI(1) - PSI(15):
0 indicates that the 5GSM state of the corresponding multi access PDU session is multi access PDU SESSION INACTIVE
1 indicates that the 5GSM state of the corresponding multi access PDU session is multi access PDU SESSION ACTIVE
All bits in octet 5 to 34 are spare and shall be coded as zero, if the respective octets is included in the information element In addition, this multi-access PDU session status information element is an information element included in the service request message as shown in Table 33.

TABLE 33

| IEI | Information Element | Type/Reference | Presence | Format | Length |
|---|---|---|---|---|---|
| | Extended protocol discriminator | Extended protocol discriminator 9.2 | M | V | 1 |
| | Security header Type | Security header Type 9.3 | M | V | 1/2 |
| | Spare half octet | Spare half octet 9.5 | M | V | 1/2 |
| | Service request message identity | Message type 9.7 | M | V | 1 |
| | ngKSI | NAS key set identifier 9.11.3.32 | M | V | 1/2 |
| | Service type | Service type 9.11.3.50 | M | V | 1/2 |
| | 5G-S-TMSI | 5GS mobile identity 9.11.3.4 | M | LV-E | 9 |
| 40 | Uplink data status | Uplink data status 9.11.3.57 | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |
| | Multi access PDU session status | Multi access PDU session status | O | TLV | 4-34 |

At step 511, the AMF transmits a service accept message to the UE as shown in Table 34.

TABLE 34

| IEI | Information Element | Type/Reference | Presence | Format | Length |
|---|---|---|---|---|---|
| | Extended prtocol discriminator | Extended protocol discriminator 9.2 | M | V | 1 |
| | Security header type | Security header type 9.3 | M | V | 1/2 |
| | Spare halt octet | Spare half octet 9.5. | M | V | 1/2 |
| | Service accept message identity | Message type 9.7 | M | V | 1 |
| 50 | PDU session status | PDU Session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |
| 78 | EAP message | EAP message 9.11.2.2. | O | TLV-E | 7-1503 |
| | Multi access PDU session reactivation result | Multi access PDU session activation result | O | TLV-E | 4-34 |
| | Multi access PDU session reactivation result error cause | Multi access PDU session reactivation result error cause | O | TLV-E | 5-515 |

Here, a multi-access PDU session reactivation result may be transmitted to inform information about the result of the multi-access PDU session activation requested in the service request. This information may be transmitted by being included in the multi-access PDU session reactivation result information element as shown in Table 35 included in the service accept message at step 511.

The information element in Table 35 is coded and interpreted as in Table 36.

TABLE 35

| 8 | 7 | 6 | 5 | 4 | 3 | 2 | 1 | |
|---|---|---|---|---|---|---|---|---|
| Multi access PDU session reactivation result |E| | | | | | | | | octet 1 |
| Length of multi access PDU session reactivation result contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare | | | | | | | | octet 5*-34* |

TABLE 36

PSI(x) shall be coded as follows:
PSI(0):
Bit 0 of octet 3 is spare and shall be coded as zero.
PSI(1)-PSI(15):
0     indicates establishment of user-plane resources of the multi access PDU session was not allowed in the multi acess PDU session reactivation status IE or establishment of user-plane resource of the PDU session is successful.
1     indicates establishment of user plane resources of the PDU session was requested in the multi access PDU session status IE but establishment of user-plane resource of the multi access PDU session is either not performed or not successful
All bits in octet 5 to 34 are spare and shall be coded as zero, if the respective octet is included in the information element.

Additionally, at this time, to inform information about an error occurrence together with the result of the multi-access PDU session activation requested in the service request, information about the error may be included in the multi-access PDU session reactivation result error cause information element as shown in Table 37 and transmitted. This multi-access PDU session reactivation result error cause information element may be transmitted by being included in the service accept message at step 511.

Coding and interpretation for Table 37 are shown in Table 38.

That is, it is possible to notify various causes (reasons) given in the 5GMM cause information element, such as insufficient resource for a PDU session, insufficient resource for a specific DNN or slice, or insufficient resource for a specific slice.

TABLE 37

| 8 | 7 | 6 | 5 | 4 | 3 | 2 | 1 | |
|---|---|---|---|---|---|---|---|---|
| Multi access PDU session reactivation result error cause |E| | | | | | | | | octet 1 |
| Length of multi access PDU session reactivation result error cause | | | | | | | | octet 2 |
| | | | | | | | | octet 3 |
| PDU session ID | | | | | | | | octet 4 |
| cause value | | | | | | | | octet 5 |
| ... | | | | | | | | |
| PDU session ID | | | | | | | | octet 514* |
| cause value | | | | | | | | octet 515* |

TABLE 38

PDU session ID is coded same as PDU session ID IE

The cause value is coded same as second octet of 5GMM information element

Alternatively, as another embodiment, there may be a method in which the AMF informs the UE of the result of multiple access PDU session reactivation by utilizing the existing PDU session reactivation result IE (information element). When using the existing PDU session reactivation result IE (information element), an information element notifying the UE that the AMF supports a multiple access PDU session or multiple access PDU session reactivation may be added.

The configuration of such multiple access PDU session or multiple access PDU session reactivation supporting indication IE (information element) is shown in Table 39 below, and the interpretation and coding thereof are shown in Table 39-1.

TABLE 39

| 8 | 7 | 6 | 5 | 4 | 3 | 2 | 1 | |
|---|---|---|---|---|---|---|---|---|
| Multiple access PDU session supporting indication IEI | | | 0 Spare | 0 Spare | 0 Spare | Multiple PDU session supporting | Multiple access | octet 1 |

TABLE 39-1

Multiple access PDU session supporting Indication (octet 1)
Bit
1
0    Multiple access PDU session is not supported
1    Multiple access PDU session is supported.
Bits 2, 3 and 4 are spare and shall be coded as zero.

In addition, information about the access type that indicates the access at which reactivation has occurred or an error or problem has occurred may be added.

At step 513, the AMF transmits a PDU session update request message to the SMF.

At step 515, the SMF transmits a PDU session update response message to the AMF.

Unlike FIGS. 2 to 4, FIG. 5 is an embodiment in which the process of PDU session update request and PDU session update response occurs after the process of service request and service accept. Likewise, an embodiment where the process of PDU session update request and PDU session update response occurs after the process of service request is possible, the process of PDU session update request and PDU session update response may occur in the middle of the process of service request and accept as in FIGS. 2 to 4, the process of PDU session update request and PDU session update response may occur after the process of service request and accept as in FIG. 5, or the process of PDU session update request and PDU session update response may occur in both cases.

(Method 5)

Figure 6:
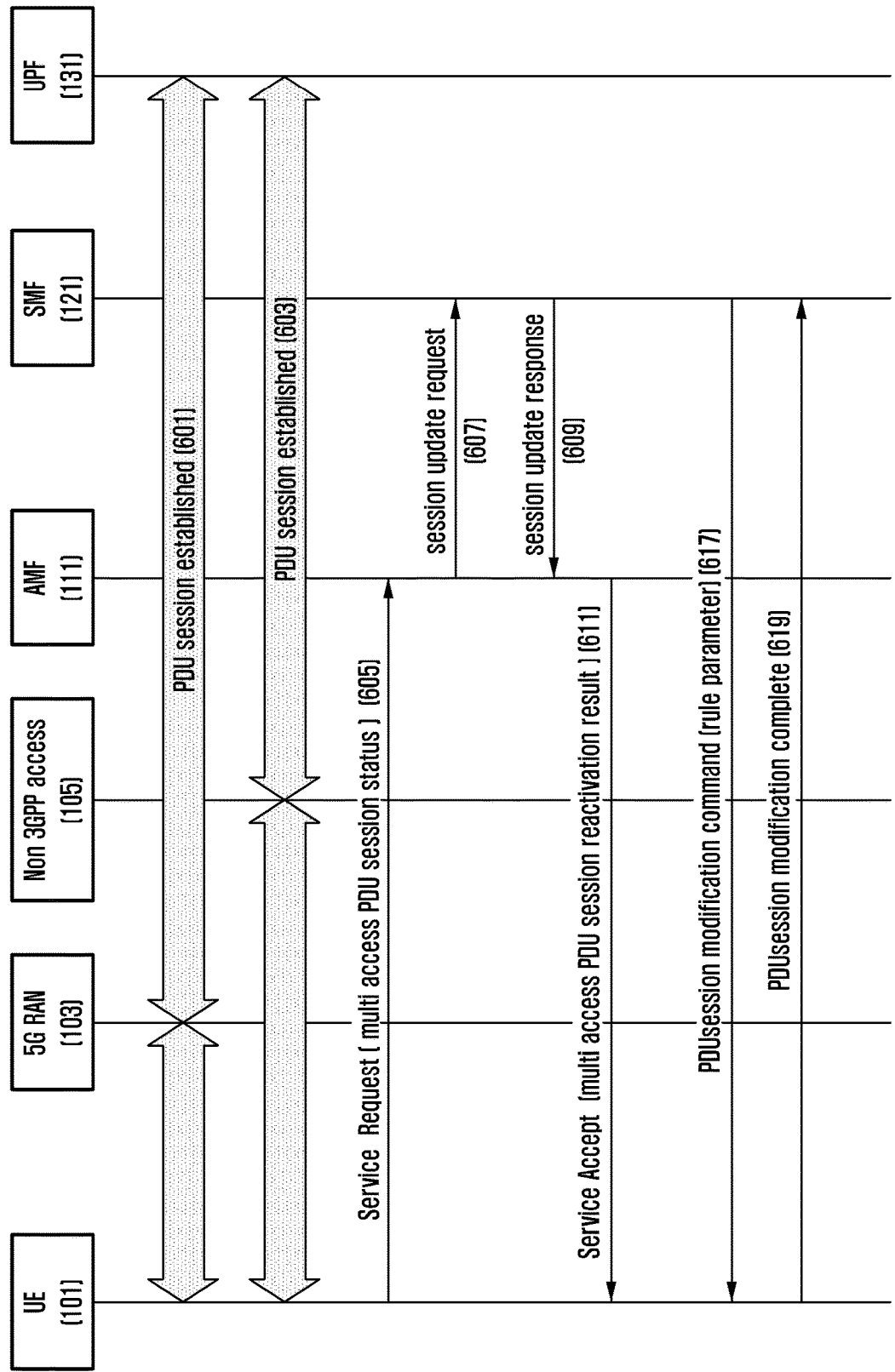
FIG. 6 illustrates an embodiment of a communication procedure and method for mobility management and session activation through NAS protocols in a 5G network environment according to an embodiment of the disclosure.

FIG. 6 illustrates an embodiment of a communication procedure and method for mobility management and session activation through NAS protocols in a 5G network environment according to an embodiment of the disclosure.

At step 601, the UE has established a PDU session with the UPF to communicate. Here, the PDU session has been established through the 5G RAN; that is, data communication is being performed through the UE, 5G RAN and UPF.

At step 603, the UE has established a PDU session with the UPF to communicate. In this case, the PDU session has been established through non-3GPP access, for example, WiFi, trusted WiFi, or non-trusted WiFi; that is, data communication is being performed through the UE, non-3GPP access and UPF.

At step 605, the UE transmits a service request to the AMF. Here, the UE may transmit a service request to the AMF through 3GPP access. In another embodiment, the UE may transmit a service request to the AMF through non-3GPP access. Here, the status of the multi-access PDU session may be informed to the AMF through a multi-access PDU session status information element.

This multi-access PDU session status information element is configured as shown in Table 41. And, multi-access PDU session status information can be coded and interpreted as shown in Table 42.

TABLE 41

| 8 | 7 | 6 | 5 | 4 | 3 | 2 | 1 | |
|---|---|---|---|---|---|---|---|---|
| Multi access PDU session status IEI | | | | | | | | octet 1 |
| Length of multi access PDU session status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare | | | | | | | | octet 5*-34* |

TABLE 42

PSI(x) shall be coded as follows.
PSI(0):
Bit 1 of octet 3 is spare and shall be coded as zero
PSI(1) - PSI(15):
0 indicates that the 5GSM state of the corresponding multi access PDU session is multi access PDU SESSION INACTIVE
1 indicates that the 5GSM state of the corresponding multi access PDU session is multi access PDU SESSION ACTIVE
All bits in octet 5 to 34 are spare and shall be coded as zero, if the respective octets is included in the information element In addition, this multi-access PDU session status information element is an information element included in the service request message as shown in Table 43.

TABLE 43

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Service request message identity | Message type 9.7 | M | V | 1 |
| | ngKSI | NAS key set identifier 9.11.3.32 | M | V | 1/2 |
| | Service type | Service type 9.11.3.50 | M | V | 1/2 |
| | 5G-S-TMSI | 5GS mobile identity 9.11.3.4 | M | LV-E | 9 |
| 40 | Uplink data status | Uplink data status 9.11.3.57 | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |
| | Multi access PDU session status | Multi access PDU session status | O | TLV | 4-34 |

At step 607, the AMF transmits a PDU session update request message to the SMF.

At step 609, the SMF transmits a PDU session update response message to the AMF.

At step 611, the AMF transmits a service accept message to the UE as shown in Table 44.

TABLE 44

| IEI | Information Element | Type/Reference | Presence | Format | Length |
|---|---|---|---|---|---|
| | Extended prtocol discriminator | Extended protocol discriminator 9.2 | M | V | 1 |
| | Security header type | Security header type 9.3 | M | V | 1/2 |
| | Spare halt octet | Spare half octet 9.5. | M | V | 1/2 |
| | Service accept message identity | Message type 9.7 | M | V | 1 |
| 50 | PDU session status | PDU Session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |
| 78 | EAP message | EAP message 9.11.2.2. | O | TLV-E | 7-1503 |
| | Multi access PDU session reactivation result | Multi access PDU session activation result | O | TLV-E | 4-34 |
| | Multi access PDU session reactivation result error cause | Multi access PDU session reactivation result error cause | O | TLV-E | 5-515 |

Here, a multi-access PDU session reactivation result may be transmitted to inform information about the result of the multi-access PDU session activation requested in the service request. This information may be transmitted by being included in the multi-access PDU session reactivation result information element as shown in Table 45 included in the service accept message at step 611.

The information element in Table 45 is coded and interpreted as in Table 46.

TABLE 45

| 8 | 7 | 6 | 5 | 4 | 3 | 2 | 1 | |
|---|---|---|---|---|---|---|---|---|
| Multi access PDU session reactivation result IEI ||||||||  octet 1 |
| Length of multi access PDU session reactivation result contents |||||||| octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | | |
| spare |||||||| octet 5*-34* |

TABLE 46

PSI(x) shall be coded as follows:
PSI(0):
Bit 0 of octet 3 is spare and shall he coded as zero.
PSI(1)-PSI(15):
  0   indicates establishment of user-plane resources of
the multi access PDU session was not allowed in the multi
acess PDU session reactivation status IE or establishment
of user-plane resource of the PDU session is successful.
  1   indicates establishment of user plane resources of the
PDU session was requested in the multi access PDU session
status IE but establishment of user-plane resource of the multi
access PDU session is either not performed or not successful
All bits in octet 5 to 34 are spare and shall be coded as zero,
if the respective octet is included in the information element.

Additionally, at this time, to inform information about an error occurrence together with the result of the multi-access PDU session activation requested in the service request, information about the error may be included in the multi-access PDU session reactivation result error cause information element as shown in Table 47 and transmitted. This multi-access PDU session reactivation result error cause information element may be transmitted by being included in the service accept message at step 611.

Coding and interpretation for Table 47 are shown in Table 48.

That is, it is possible to notify various causes (reasons) given in the 5GMM cause information element, such as insufficient resource for a PDU session, insufficient resource for a specific DNN or slice, or insufficient resource for a specific slice.

TABLE 47

| 8 | 7 | 6 | 5 | 4 | 3 | 2 | 1 | |
|---|---|---|---|---|---|---|---|---|
| Multi access PDU session reactivation result error cause IEI ||||||||  octet 1 |
| Length of multi access PDU session reactivation result error cause |||||||| octet 2 |
| |||||||| octet 3 |
| PDU session ID |||||||| octet 4 |
| cause value |||||||| octet 5 |
| . . . ||||||||  |
| PDU session ID |||||||| octet 514* |
| cause value |||||||| octet 515* |

TABLE 48

PDU session ID is coded same as PDU session ID IE

The cause value is coded same as second octet of 5GMM cause information element

Alternatively, as another embodiment, there may be a method in which the AMF informs the UE of the result of multiple access PDU session reactivation by utilizing the existing PDU session reactivation result IE (information element). When using the existing PDU session reactivation result IE (information element), an information element notifying the UE that the AMF supports a multiple access PDU session or multiple access PDU session reactivation may be added.

The configuration of such multiple access PDU session or multiple access PDU session reactivation supporting indication IE (information element) is shown in Table 48-1 below, and the interpretation and coding thereof are shown in Table 48-2.

TABLE 48-1

| 8 | 7 | 6 | 5 | 4 | 3 | 2 | 1 | |
|---|---|---|---|---|---|---|---|---|
| Multiple access PDU session supporting indication IEI | 0 | 0 | 0 | Spare | Spare | Spare | Multiple Multiple access PDU session supporting | octet 1 |

TABLE 48-2

| Multiple access PDU session supporting Indication (octet 1) |
|---|
| Bit |
| 1 |
| 0   Multiple access PDU session is not supported |
| 1   Multiple access PDU session is supported. |
| Bits 2, 3 and 4 are spare and shall be coded as zero |

In addition, information about the access type that indicates the access at which reactivation has occurred or an error or problem has occurred may be added.

At step 617, the SMF transmits a PDU session modification command to the UE. At this time, information related to the multi-access PDU session, for example, parameters related to a multiple access PDU session parameter container may be transmitted, and the multiple access PDU session parameter container may include information such as multiple access PDU session related rules, an IP address and port number of the multi-path TCP (MPTCP) proxy, and a UE link specific address.

TABLE 49

PDU session modification command

| IEI | Information Element | Type/Reference | Presence | Format | Length |
|---|---|---|---|---|---|
|  | Extended protocol discriminator | Extended protocol discriminator 9.2 | M | V | 1 |
|  | PDU session ID | PDU session Identity 9.4 | M | V | 1 |
|  | PTI | Procedure transaction identity 9.6 | M | V | 1 |
|  | PDU SESSION MODIFICATION COMMAND message identity | Message type 9.7 | M | V | 1 |
| 59 | 5GSM cause | 5GSM cause 9.11.4.2 | O | TV | 2 |
| 2A | Session AMBR | Session-AMBR 9.11.4.14 | O | TLV | 8 |
| 56 | RQ timer value | GPRS time 9.11.2.3 | O | TV | 2 |
| 8- | Always-on PDU session indication | Always-on PDU session indication 9.11.4 3 | O | TV | 1 |
| 7A | Authorized QoS rules | QoS rules 9.11.4.13 | O | TLV-E | 7-65538 |
| 75 | Mapped EPS bearer contexts | Mapped EPS bearer context 9.11.4.8 | O | TLV-E | 7-65538 |
| 79 | Authorized QoS flow descriptions | QoS flow descriptions 9.11.4.12 | O | TLV-E | 6-65538 |
| 7B | Extended protocol configuration options | Extended protocol configuration options 9.11.4.6 | O | TLV-E | 4-65538 |
|  | Multiple access PDU session parameter container | Multiple access PDU session parameter container | O | TLV-E | 3-65538 |

At step 619, the UE transmits a PDU session modification complete message to the SMF.
(Method 6)

Figure 7:
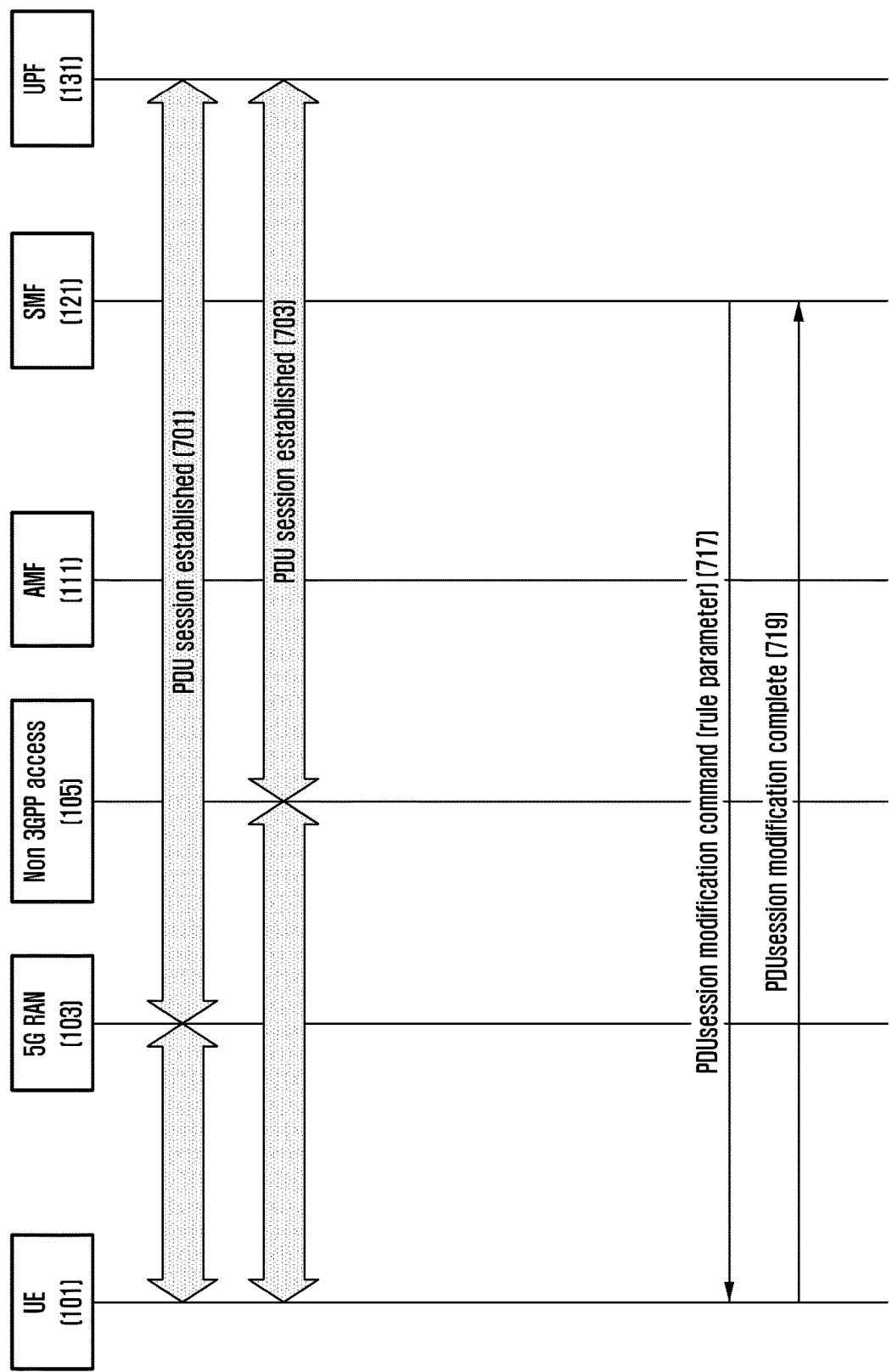
FIG. 7 illustrates an embodiment of a communication procedure and method for mobility management and session activation through NAS protocols in a 5G network environment according to an embodiment of the disclosure.

FIG. 7 illustrates an embodiment of a communication procedure and method for mobility management and session activation through NAS protocols in a 5G network environment according to an embodiment of the disclosure.

At step 701, the UE has established a PDU session with the UPF to communicate. Here, the PDU session has been established through the 5G RAN; that is, data communication is being performed through the UE, 5G RAN and UPF.

At step 703, the UE has established a PDU session with the UPF to communicate. In this case, the PDU session has been established through non-3GPP access, for example, WiFi, trusted WiFi, or non-trusted WiFi; that is, data communication is being performed through the UE, non-3GPP access and UPF.

At step 717, the SMF transmits a PDU session modification command to the UE. At this time, information related to the multi-access PDU session, for example, parameters related to a multiple access PDU session parameter container may be transmitted, and the multiple access PDU session parameter container may include information such as multiple access PDU session related rules, an IP address and port number of the multi-path TCP (MPTCP) proxy, and a UE link specific address.

TABLE 59

PDU session modification command

| IEI | Information Element | Type/Reference | Presence | Format | Length |
|---|---|---|---|---|---|
|  | Extended protocol discriminator | Extended protocol discriminator 9.2 | M | V | 1 |
|  | PDU session ID | PDU session Identity 9.4 | M | V | 1 |
|  | PTI | Procedure transaction identity 9.6 | M | V | 1 |
|  | PDU SESSION MODIFICATION COMMAND message identity | Message type 9.7 | M | V | 1 |
| 59 | 5GSM cause | 5GSM cause 9.11.4.2 | O | TV | 2 |
| 2A | Session AMBR | Session-AMBR 9.11.4.14 | O | TLV | 8 |
| 56 | RQ timer value | GPRS time 9.11.2.3 | O | TV | 2 |
| 8- | Always-on PDU session indication | Always-on PDU session indication 9.11.4 3 | O | TV | 1 |
| 7A | Authorized QoS rules | QoS rules 9.11.4.13 | O | TLV-E | 7-65538 |
| 75 | Mapped EPS bearer contexts | Mapped EPS bearer context 9.11.4.8 | O | TLV-E | 7-65538 |
| 79 | Authorized QoS flow descriptions | QoS flow descriptions 9.11.4.12 | O | TLV-E | 6-65538 |
| 7B | Extended protocol configuration options | Extended protocol configuration options 9.11.4.6 | O | TLV-E | 4-65538 |
|  | Multiple access PDU session parameter container | Multiple access PDU session parameter container | O | TLV-E | 3-65538 |

At step 719, the UE transmits a PDU session modification complete message to the SMF.

Figure 8:
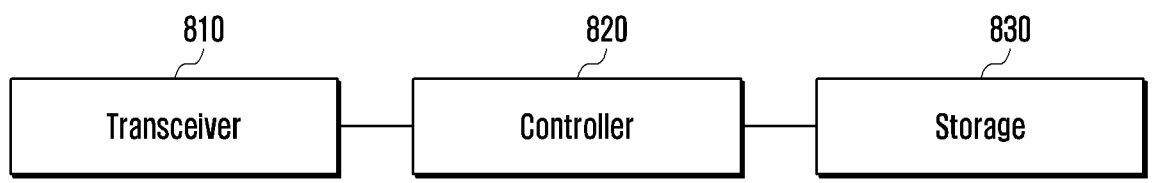
FIG. 8 is a diagram illustrating the structure of a terminal according to an embodiment of the disclosure.

FIG. 8 is a diagram illustrating the structure of a terminal according to an embodiment of the disclosure.

With reference to FIG. 8, the terminal may include a transceiver 810, a controller 820, and a storage 830. In the disclosure, the controller may be defined as a circuit, an application-specific integrated circuit, or at least one processor.

The transceiver 810 may transmit and receive signals to and from other network entities. The transceiver 810 may receive system information from, for example, a base station, and may receive a synchronization signal or a reference signal.

The controller 820 may control the overall operation of the terminal according to the embodiments proposed in the disclosure. For example, the controller 820 may control signal flows between blocks to perform operations according to the flowcharts depicted in FIGS. 2 to 7 and FIG. 10.

The storage 830 may store at least one of information transmitted and received through the transceiver 810 or information generated through the controller 820.

Figure 9:
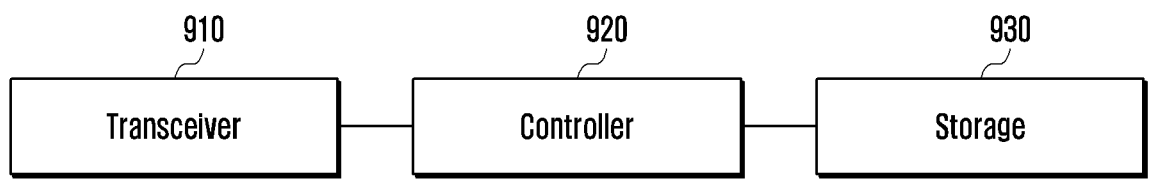
FIG. 9 is a diagram illustrating the structure of a network entity according to an embodiment of the present disclosure.

FIG. 9 is a diagram illustrating the structure of a network entity according to an embodiment of the present disclosure. The network entity shown in FIG. 9 may be one of the entities 103 to 171 in the network shown in FIG. 1.

With reference to FIG. 8, the network entity may include a transceiver 910, a controller 920, and a storage 930. In the disclosure, the controller may be defined as a circuit, an application specific integrated circuit, or at least one processor.

The transceiver 910 may transmit and receive signals to and from a terminal or other network entity.

The controller 920 may control the overall operation of the network entity according to the embodiments proposed in the disclosure. For example, the controller 920 may control signal flows between blocks to perform operations according to the flowcharts depicted in FIGS. 2 to 7 and FIG. 10.

The storage 930 may store at least one of information transmitted and received through the transceiver 910 or information generated through the controller 920.

(Method 8)

Figure 10:
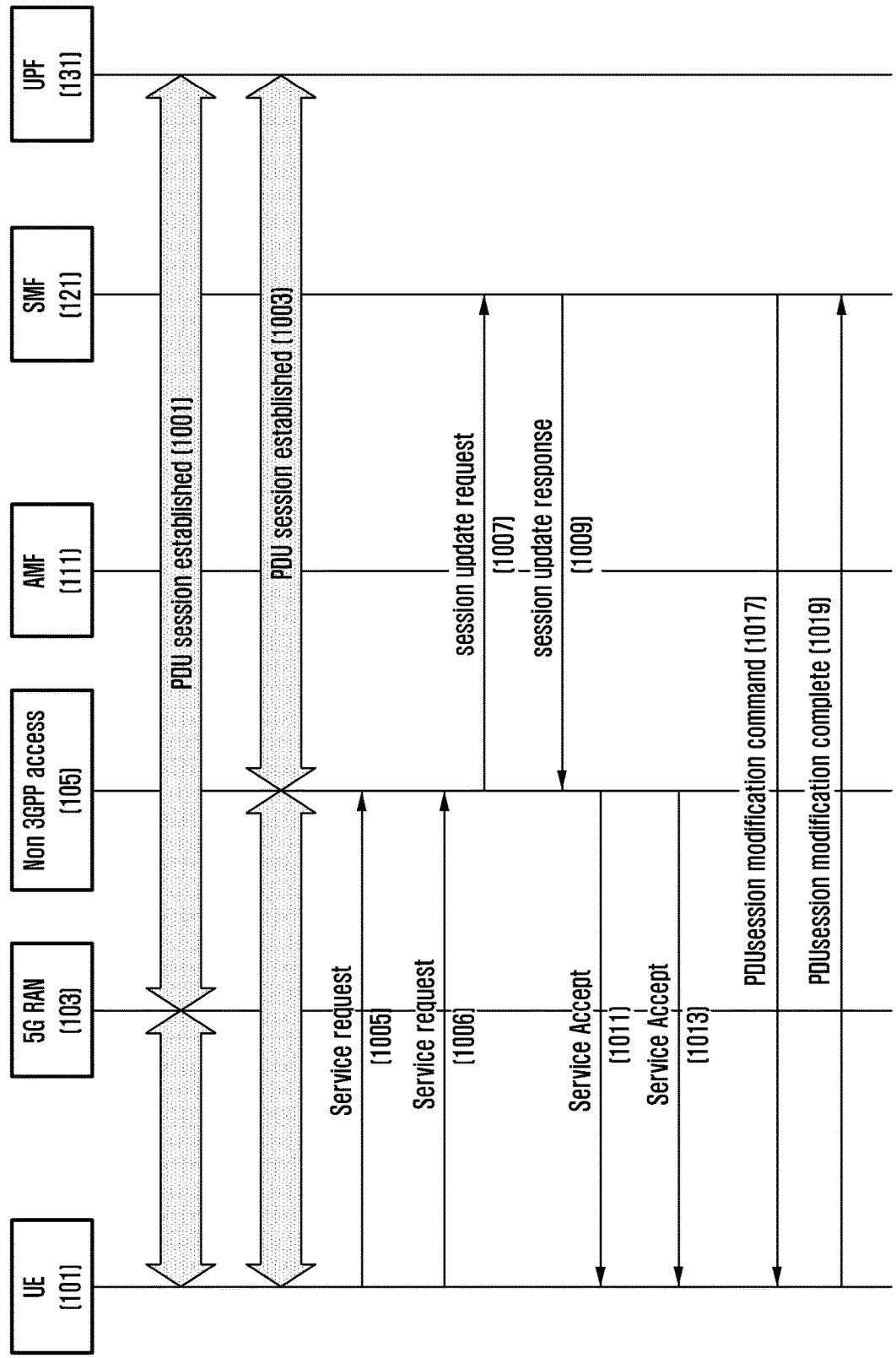
FIG. 10 illustrates an embodiment of a communication procedure and method for mobility management and session activation through NAS protocols in a 5G network environment according to an embodiment of the disclosure.

FIG. 10 illustrates an embodiment of a communication procedure and method for mobility management and session activation through NAS protocols in a 5G network environment according to an embodiment of the disclosure.

At step 1001, the UE has established a PDU session with the UPF to communicate. Here, the PDU session has been established through the 5G RAN; that is, data communication is being performed through the UE, 5G RAN and UPF.

At step 1003, the UE has established a PDU session with the UPF to communicate. In this case, the PDU session has been established through non-3GPP access, for example, WiFi, trusted WiFi, or non-trusted WiFi; that is, data communication is being performed through the UE, non-3GPP access and UPF.

Step 1005 and step 1006 below correspond to a situation that may occur when one or both of 3GPP access and non-3GPP access are not active and the UE is not in the connected state as to the corresponding access, and both or one of step 1005 and step 1006 may be performed to reactivate the user plane of the multiple access PDU session for the non-active access.

At step 1005, the UE transmits a service request to the AMF. Here, the UE may transmit a service request to the AMF through 3GPP access.

Here, in one embodiment, the status of the multi-access PDU session may be informed to the AMF through a multi-access PDU session status information element.

In this case, in another embodiment, whether the PDU session identified by the PDU session identity is active may be notified through the PDU session status information element. That is, when the UE has released the multi-access (MA) PDU session for the corresponding access (here, 5G RAN access at step 1005), it may notify the AMF of whether the MA PDU session has been released through the PDU session status information element of the service request message; the AMF may receive this and notify the SMF to release the network resource corresponding to the identity of the multi access (MA) PDU session.

At this time, in another embodiment, the uplink data status may be used to notify that uplink data associated with the multiple access (MA) PDU session, that is, the corresponding MA PDU session identity is pending.

Additionally, in one embodiment, as a case of executing a service request through 3GPP access, a case is illustrated where the session can be recovered when the service request is sent through 3GPP access but the access situation has changed from before. That is, for example, when 70% of the flow has been sent through 3GPP and 30% has been sent through non-3GPP before the service request, and when 80% of the flow is sent through 3GPP and 20% is sent through non-3GPP after the service request, such information may be notified by using this method.

In such a case, after the service accept, parameters related to the multiple access PDU session may be changed through a PDU session modification command as at steps 1017 and 1019, and accordingly, it is possible to adjust the transmission rates or ratios of the flows transmitted for the corresponding PDU session.

Meanwhile, in one embodiment, the multi-access PDU session status information element is configured as shown in Table 61. And, multi-access PDU session status information can be coded and interpreted as shown in Table 62.

TABLE 61

| 8 | 7 | 6 | 5 | 4 | 3 | 2 | 1 | |
|---|---|---|---|---|---|---|---|---|
| Multi access PDU session status IEI | | | | | | | | octet 1 |
| Length of multi access PDU session status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare | | | | | | | | octet 5*-34* |

TABLE 62

PSI(x) shall be coded as follows:
PSI(0):
Bit 1 of octet 3 is spare and shall he coded as zero.
PSI(1)-PSI(15):
0    indicates that the 5GSM state of the correspoinding multi access PDU session is multi access PDU SESSION INACTIVE
1    indicates that the 5GSM state of the correspoinding multi access PDU session is multi access PDU SESSION ACTIVE
All bits in octet 5 to 34 are spare and shall be coded as zero, if the respective octet is included in the information element.

In addition, this multi-access PDU session status information element is an information element included in the service request message as shown in Table 63.

TABLE 63

| IEI | Information Element | Type/Reference | Presence | Format | Length |
|---|---|---|---|---|---|
| | Extended protocol discriminator | Extended protocol discriminator 9.2 | M | V | 1 |
| | Security Header Type | Security Header Type 9.3 | M | V | 1/2 |
| | Spare half octet | Spare half octet 9.5 | M | V | 1/2 |
| | Service request message identity | Message type 9.7 | M | V | 1 |
| | ngKSI | NAS key set identifier 9.11.3.32 | M | V | 1/2 |
| | Service type | Service type 9.11.3.50 | M | V | 1/2 |
| | 5G-S-TMSI | 5GS mobile identity 9.11.3.4 | M | LV-E | 9 |
| 40 | Uplink data status | Uplink data status 9.11.3.57 | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |
| | Multi access PDU session status | Multi access PDU session status | O | TLV | 4-34 |

At step 1006, the UE transmits a service request message to the AMF. Here, the UE may transmit a service request message to the AMF through non-3GPP access.

Here, the status of the multi-access PDU session may be informed to the AMF through a multi-access PDU session status information element.

In this case, in another embodiment, whether the PDU session identified by the PDU session identity is active may be notified through the PDU session status information element. That is, when the UE has released the multi-access (MA) PDU session for the corresponding access (here, non-3GPP access at step 1006), it may notify the AMF of whether the MA PDU session has been released through the PDU session status information element; the AMF may receive this and notify the SMF to release the network resource corresponding to the identity of the multi access (MA) PDU session.

At this time, in another embodiment, the uplink data status may be used to notify that uplink data associated with the corresponding MA PDU session identity is pending.

Step 1006 is a case of executing a service request through non-3GPP access, and illustrates a case where the session can be recovered when the service request is sent through non-3GPP access but the access situation has changed from before. That is, for example, when 70% of the flow has been sent through 3GPP and 30% has been sent through non-3GPP before the service request, and when 80% of the flow is sent through 3GPP and 20% is sent through non-3GPP after the service request, such information may be notified by using this method.

In this case, after the service accept, parameters related to the multiple access PDU session may be changed through a PDU session modification command as at steps 1017 and 1019, and accordingly, it is possible to adjust the transmission rates or ratios of the flows transmitted for the corresponding PDU session.

Meanwhile, in one embodiment, the multi-access PDU session status information element is configured as shown in Table 61-2. And, multi-access PDU session status information can be coded and interpreted as shown in Table 62-2.

TABLE 61-2

| 8 | 7 | 6 | 5 | 4 | 3 | 2 | 1 | |
|---|---|---|---|---|---|---|---|---|
| Multi access PDU session status IEI | | | | | | | | octet 1 |
| Length of multi access PDU session status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare | | | | | | | | octet 5*-34* |

TABLE 62-2

PSI(x) shall be coded as follows.
PSI(0):
Bit 1 of octet 3 is spare and shall be coded as zero
PSI(1) - PSI(15):
0 indicates that the 5GSM state of the corresponding multi access PDU session is multi access PDU SESSION INACTIVE
1 indicates that the 5GSM state of the corresponding multi access PDU session is multi access PDU SESSION ACTIVE
All bits in octet 5 to 34 are spare and shall be coded as zero, if the respective octets is included in the information element In addition, this multi-access PDU session status information element is an information element included in the service request message as shown in Table 63-2.

TABLE 63-2

| IEI | Information Element | Type/Reference | Presence | Format | Length |
|---|---|---|---|---|---|
| | Extended protocol discriminator | Extended protocol discriminator 9.2 | M | V | 1 |
| | Security Header type | Security Header type 9.3 | M | V | 1/2 |
| | Spare half octet | Spare half octet 9.5 | M | V | 1/2 |
| | Service request message identity | Message type 9.7 | M | V | 1 |
| | ngKSI | NAS key set identifier 9.11.3.32 | M | V | 1/2 |
| | Service type | Service type 9.11.3.50 | M | V | 1/2 |
| | 5G-S-TMSI | 5GS mobile identity 9.11.3.4 | M | LV-E | 9 |
| 40 | Uplink data status | Uplink data status 9.11.3.57 | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |
| | Multi access PDU session status | Multi access PDU session status | O | TLV | 4-34 |

At step 1007, the AMF transmits a PDU session update request message to the SMF.

At step 1009, the SMF transmits a PDU session update response message to the AMF.

Step 1011 or step 1013 below corresponds to a situation that may occur when one or both of 3GPP access and non-3GPP access are not active and the UE is not in the connected state as to the corresponding access, and both or one of step 1011 and step 1013 may be performed to reactivate the user plane of the multiple access PDU session for the non-active access.

At step 1011, the AMF transmits a service accept message to the UE as shown in Table 64.

The corresponding process may occur through 3GPP access.

TABLE 64

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half ocret 9.5 | M | V | 1/2 |
| | Service accept message identity | Message type 9.7 | M | V | 1 |
| 50 | PDU session status | PDU session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result cause 9.11.3.43 | O | TLV-E | 5-515 |
| 78 | EAP message | EAP message 9.11.2.2 | O | TLV-E | 7-1503 |
| | Multi access PDU session reactivation result | Multi access PDU session reactivation result | O | TLV-E | 4-34 |
| | Multi access PDU session reactivation result error cause | Multi access PDI session reactivation result error cause | O | TLV-E | 5-515 |

In this case, in one embodiment, when the AMF informs the UE that the PDU session for the corresponding multiple access (MA) PDU session identity is inactive through the PDU session status information element, the UE may release the corresponding PDU session.

Here, a multi-access PDU session reactivation result may be transmitted to inform information about the result of the multi-access PDU session activation requested in the service request. This information may be transmitted by being included in the multi-access PDU session reactivation result information element as shown in Table 65 included in the service accept message at step 1011.

The information element in Table 65 is coded and interpreted as in Table 66.

TABLE 65

| 8 | 7 | 6 | 5 | 4 | 3 | 2 | 1 | |
|---|---|---|---|---|---|---|---|---|
| Multi access PDU session reactivation result IEI | | | | | | | | octet 1 |
| Length of multi access PDU sesson reactivation result contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare | | | | | | | | octet 5*-34* |

TABLE 66

PSI(x) shall be coded as follows:
PSI(0):
Bit 0 of octet 3 is spare and shall he coded as zero.
PSI(1)-PSI(15):
0   indicates establishment of user-plane resources of
the multi access PDU session was not allowed in the multi TABLE 66-continued acess PDU session reactivation status IE or establishment
of user-plane resource of the PDU session is successful.
1   indicates establishment of user plane resources of the
PDU session was requested in the multi access PDU session
status IE but establishment of user-plane resource of the multi
access PDU session is either not performed or not successful
All bits in octet 5 to 34 are spare and shall be coded as zero,
if the respective octet is included in the information element Additionally, at this time, to inform information about an error occurrence together with the result of the multi-access PDU session activation requested in the service request, information about the error may be transmitted by being included in the multi-access PDU session reactivation result error cause information element as shown in Table 67. This multi-access PDU session reactivation result error cause information element may be transmitted by being included in the service accept message at step 1011.

Coding and interpretation for Table 67 are shown in Table 68.

That is, it is possible to notify various causes (reasons) given in the 5GMM cause information element, such as insufficient resource for a PDU session, insufficient resource for a specific DNN or slice, or insufficient resource for a specific slice.

TABLE 67

| 8 | 7 | 6 | 5 | 4 | 3 | 2 | 1 | |
|---|---|---|---|---|---|---|---|---|
| Multi access PDU session reactivation result error cause IEI | | | | | | | | octet 1 |
| Length of multi access PDU session reactivation result error cause | | | | | | | | octet 2 |
| PDU session ID | | | | | | | | octet 3 |
| cause value | | | | | | | | octet 4 |
| PDU session ID | | | | | | | | octet 5 |
| cause value | | | | | | | | octet 514* |
| | | | | | | | | octet 515* |

PDU session ID is coded same as PDU session ID IE
The cause calue is coded same as second octet of 5GMM cause information element Alternatively, as another embodiment, there may be a method in which the AMF informs the UE of the result of multiple access PDU session reactivation for the corresponding access by utilizing a PDU session reactivation result IE (information element) included in the existing service accept message. When using the existing PDU session reactivation result IE (information element), an information element notifying the UE that the AMF supports a multiple access PDU session or multiple access PDU session reactivation may be added.

The configuration of such multiple access PDU session or multiple access PDU session reactivation supporting indication IE (information element) is shown in Table 68-1 below, and the interpretation and coding thereof are shown in Table 68-2.

TABLE 68-1

| 8 | 7 | 6 | 5 | 4 | 3 | 2 | 1 | |
|---|---|---|---|---|---|---|---|---|
| Multiple access PDU session supporting indication IEI | | | 0 Spare | 0 Spare | 0 Spare | Multiple PDU session supporting | Multiple access | octet 1 |

TABLE 68-2

Multiple access PDU session supporting Indication (octet 1)
Bit
1
0   Multiple access PDU session is not supported
1   Multiple access PDU session is supported
Bits 2. 3 and 4 are spare and shall be coded as zero.

In addition, information about the access type that indicates the access at which reactivation has occurred or an error or problem has occurred may be added.

This access type is information on whether 3GPP access or non-3GPP access.

At step 1013, the AMF transmits a service accept message to the UE as shown in Table 64-3.

This process may occur through non-3GPP access.

TABLE 64-3

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half ocret 9.5 | M | V | 1/2 |
| | Service accept message identity | Message type 9.7 | M | V | 1 |
| 50 | PDU session status | PDU session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result cause 9.11.3.43 | O | TLV-E | 5-515 |
| 78 | EAP message | EAP message 9.11.2.2 | O | TLV-E | 7-1503 |
| | Multi access PDU session reactivation result | Multi access PDU session reactivation result | O | TLV-E | 4-34 |
| | Multi access PDU session reactivation result error cause | Multi access PDI session reactivation result error cause | O | TLV-E | 5-515 |

Here, in one embodiment, when the AMF informs the UE that the PDU session for the corresponding multiple access (MA) PDU session identity is inactive through the PDU session status information element, the UE may release the corresponding PDU session.

Here, a multi-access PDU session reactivation result may be transmitted to inform information about the result of the multi-access PDU session activation requested in the service request. This information may be transmitted by being included in the multi-access PDU session reactivation result information element as shown in Table 65-3 included in the service accept message at step 1013.

The information element in Table 65-3 is coded and interpreted as in Table 66.

TABLE 65-3

| 8 | 7 | 6 | 5 | 4 | 3 | 2 | 1 | |
|---|---|---|---|---|---|---|---|---|
| Multi access PDU session reactivation result IEI | | | | | | | | octet 1 |
| Length of multi access PDU session reactivation result contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| spare | | | | | | | | octet 5*-34* |

TABLE 66-3

| |
|---|
| PSI(x) shall be coded as follows: |
| PSI(0): |
| Bit 0 of octet 3 is spare and shall be coded as zero. |
| PSI(1)-PSI(15): |
| 0   indicates establishment of user-plane resources of the multi access PDU session was not allowed in the multi acess PDU session reactivation status IE or establishment of user-plane resource of the PDU session is successful. |
| 1   indicates establishment of user plane resources of the PDU session was requested in the multi access PDU session status IE but establishment of user-plane resource of the multi access PDU session is either not performed or not successful |
| All bits in octet 5 to 34 are spare and shall be coded as zero, if the respective octet is included in the information element |

Additionally, at this time, to inform information about an error occurrence together with the result of the multi-access PDU session activation requested in the service request, information about the error may be transmitted by being included in the multi-access PDU session reactivation result error cause information element as shown in Table 67-3. This multi-access PDU session reactivation result error cause information element may be transmitted by being included in the service accept message at step 1013.

Coding and interpretation for Table 67-3 are shown in Table 68-3.

That is, it is possible to notify various causes (reasons) given in the 5GMM cause information element, such as insufficient resource for a PDU session, insufficient resource for a specific DNN or slice, or insufficient resource for a specific slice.

TABLE 67-3

| 8 | 7 | 6 | 5 | 4 | 3 | 2 | 1 | |
|---|---|---|---|---|---|---|---|---|
| Multi access PDU session reactivation result error cause IEI | | | | | | | | octet 1 |
| Length of multi access PDU session reactivation result error cause | | | | | | | | octet 2 |
| | | | | | | | | octet 3 |
| PDU session ID | | | | | | | | octet 4 |
| cause value | | | | | | | | octet 5 |
| PDU session ID | | | | | | | | octet 514* |
| cause value | | | | | | | | octet 515* |

TABLE 68-3

| |
|---|
| PDU session ID is coded same as PDU session ID IE |
| The cause value is coded same as second octet of 5GMM cause information element |

Alternatively, as another embodiment, there may be a method in which the AMF informs the UE of the result of multiple access PDU session reactivation for the corresponding access by utilizing a PDU session reactivation result IE (information element) included in the existing service accept message. When using the existing PDU session reactivation result IE (information element), an information element notifying the UE that the AMF supports a multiple access PDU session or multiple access PDU session reactivation may be added.

The configuration of such multiple access PDU session or multiple access PDU session reactivation supporting indication IE (information element) is shown in Table 68-11 below, and the interpretation and coding thereof are shown in Table 68-12.

TABLE 68-11

| 8 | 7 | 6 | 5 | 4 | 3 | 2 | 1 | |
|---|---|---|---|---|---|---|---|---|
| Multiple access PDU session supporting indication IEI | | 0 Spare | 0 Spare | 0 Spare | | Multiple Multiple access PDU session supporting | | octet 1 |

TABLE 68-12

| Multiple access PDU session supporting Indication (octet 1) |
|---|
| Bit 1 |
| 0    Multiple access PDU session is not supported |
| 1    Multiple access PDU session is supported |
| Bits 2, 3 and 4 are spare and shall be coded as zero |

In addition, information about the access type that indicates the access at which reactivation has occurred or an error or problem has occurred may be added.

This access type is information on whether 3GPP access or non-3GPP access.

At step 1017, the SMF transmits a PDU session modification command to the UE. At this time, information related to the multi-access PDU session, for example, parameters related to a multiple access PDU session parameter container may be transmitted, and the multiple access PDU session parameter container may include information such as multiple access PDU session related rules, an IP address and port number of the multi-path TCP (MPTCP) proxy, and a UE link specific address.

Meanwhile, in one embodiment, when a GBR QoS flow needs to be transferred from one access (source access) to another target access, the PDU session modification command may include a process of creating or modifying a QoS flow.

Also, in one embodiment, a rule related to the multiple access PDU session may be changed. In such a change, for the rule included in the PDU session modification command, information related to the multiple access PDU session, for example, a parameter related to a multiple access PDU session parameter container may be transmitted; the multiple access PDU session parameter container may include information such as multiple access PDU session related rules, an IP address and port number of the multi-path TCP (MPTCP) proxy, and a UE link specific address.

In one embodiment, while the UE and the UPF are in communication, the UPF may determine that GBR traffic cannot be transmitted through the current access, that is, 3GPP or non-3GPP. This determination may also be made by the UPF having receiving a report that access is not available from the UE. In such a case, the UPF notifies the SMF that GBR traffic cannot be transmitted in the current access by including the QFI of the GBR QoS flow. Then, the SMF receiving this notification may transfer the GBR QoS flow from the current source access to the target access. That is, the SMF may switch the GBR QoS flow in the current source access to the target access by sending a PDU session modification command message to the UE. This procedure is possible by creating a QoS flow in the target access and transferring the QoS flow in the source to the target. Here, the source access or the target access is 3GPP or non-3GPP access, and this is to move the GBR QoS flow from one of 3GPP access and non-3GPP access to another one of 3GPP access and non-3GPP access, which is accessible to the UE.

To this end,

1) The SMF should create a new authorized QoS rule for a new QoS flow, and include information about the QFI to be transferred from one access (i.e., source access) to another (i.e. target access) in the QFI (QoS flow identifier) field of the authorized Qos flow description information element in the PUD session modification message.

2) Alternatively, in one embodiment, the SMF needs to change the authorized QoS flow description information element information for the PDU session in the PUD session modification message. In one embodiment, to use the corresponding GBR QoS flow after moving QFI information used in one access to another access, the QFI (QoS flow identifier) field of the authorized QoS flow description information element should be changed to the QFI information of the corresponding GBR QoS flow and included in the PDU session modification message.

TABLE 69

| PDU session modification command | | | | |
|---|---|---|---|---|
| IEI | Information Element | Type/Reference | Presence | Format | Length |
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION MODIFICATION COMMAND message identity | Message type 9.7 | M | V | 1 |

TABLE 69-continued

PDU session modification command

| IEI | Information Element | Type/Reference | Presence | Format | Length |
|---|---|---|---|---|---|
| 59 | 5GSM cause | 5GSM cause 9.11.4.2 | O | TV | 2 |
| 2A | Session AMBR | Session-AMBR 9.11.4.14 | O | TLV | 8 |
| 56 | RQ timer value | GPRS timer 9.11.2.3 | O | TV | 2 |
| 8- | Always-on PDU session indication | Always-on PDU session indication 9.11.4.3 | O | TV | 1 |
| 7A | Authorized QoS rules | QoS rules 9.11.4.13 | O | TLV-E | 7-65538 |
| 75 | Mapped EPS bearer contexts | Mapped EPS bearer contexts 9.11.4.8 | O | TLV-E | 7-65538 |
| 79 | Authorized QoS flow descriptions | QoS flow descriptions 9.11.4.12 | O | TLV-E | 6-65538 |
| 7B | Extended protocol configuration options | Extended protocol configuration options 9.11.4.6 | O | TLV-E | 4-65538 |
|  | Multiple access PDU session parameter container | Multiple access PDU session parameter container | O | TLV-E | 3-65538 |

At step 1019, the UE transmits a PDU session modification complete message to the SMF.

Thereafter, the UE may transmit uplink GBR traffic to the UPF through the target access having been changed from the source access.

In the above-described embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Meanwhile, although specific embodiments have been described in the detailed description of the disclosure, various modifications are possible without departing from the scope of the disclosure. Therefore, the scope of the present disclosure should not be limited to the described embodiments and should be defined by the claims described below and their equivalents.

The invention claimed is:

1. A method performed by a terminal in a communication system, the method comprising:
    establishing a multi-access (MA) protocol data unit (PDU) session associated with a 3rd generation partnership project (3GPP) access and non-3GPP access;
    determining to reactivate a user plane resource of the MA PDU session for one access among the 3GPP access and the non-3GPP access;
    transmitting, to an access and mobility management function (AMF), a service request message over the one access, the service request message including uplink status information, and the uplink status information indicating the MA PDU session associated with the one access having pending uplink data; and
    receiving, from the AMF, a service accept message including information on a reactivation result for the user plane resource of the MA PDU session,
    wherein in case that the information on the reactivation result indicates a failure for reactivation of the user plane resource, the service accept message further includes information on an error cause of the failure, and
    wherein the error cause indicates insufficient resources for a specific slice.

2. The method of claim 1, wherein:
    in case that the user plane resource of the MA PDU session is associated with the 3GPP access, the service request message is transmitted over the 3GPP access, and
    in case that the user plane resource of the MA PDU session is associated with the non-3GPP access, the service request message is transmitted over the non-3GPP access.

3. The method of claim 1, wherein the uplink status information indicates that uplink data to be sent is pending for the MA PDU session.

4. A method performed by an access and mobility management function (AMF) in a communication system, the method comprising:
    receiving, from a terminal, a service request message including uplink status information over one access among a 3rd generation partnership project (3GPP) access and a non-3GPP access which are associated with a multi-access (MA) protocol data unit (PDU) session, the uplink status information indicating the MA PDU session associated with the one access having pending uplink data; and
    transmitting, to the terminal, a service accept message including information on a reactivation result of a user plane resource of the MA PDU session for the one access, based on the uplink status information,
    wherein, in case that the information on the reactivation result indicates a failure for reactivation of the user plane resource, the service accept message further includes information on an error cause of the failure, and
    wherein the error cause indicates insufficient resources for a specific slice.

5. The method of claim 4, wherein:
    in case that the user plane resource of the MA PDU session is associated with the 3GPP access, the service request message is received over the 3GPP access, and in case that the user plane resource of the MA PDU session is associated with the non-3GPP access, the service request message is received over the non-3GPP access.

6. The method of claim 4, wherein the uplink status information indicates that the MA PDU session has uplink data pending to be sent.

7. A terminal in a communication system, the terminal comprising:
a transceiver; and
a controller coupled with the transceiver and configured to:
establish a multi-access (MA) protocol data unit (PDU) session associated with a 3rd generation partnership project (3GPP) access and non-3GPP access,
determine to reactivate a user plane resource of the MA PDU session for one access among the 3GPP access and the non-3GPP access,
transmit, to an access and mobility management function (AMF), a service request message over the one access, the service request message including uplink status information, and the uplink status information indicating the MA PDU session associated with the one access having pending uplink data, and
receive, from the AMF, a service accept message including information on a reactivation result for the user plane resource of the MA PDU session,
wherein in case that the information on the reactivation result indicates a failure for reactivation of the user plane resource, the service accept message further includes information on an error cause of the failure, and
wherein the error cause indicates insufficient resources for a specific slice.

8. The terminal of claim 7, wherein:
in case that the user plane resource of the MA PDU session is associated with the 3GPP access, the service request message is transmitted over the 3GPP access, and
in case that the user plane resource of the MA PDU session is associated with the non-3GPP access, the service request message is transmitted over the non-3GPP access.

9. The terminal of claim 7, wherein the uplink status information indicates that the MA PDU session has uplink data pending to be sent.

10. An access and mobility management function (AMF) in a communication system, the AMF comprising:
a transceiver; and
a controller coupled with the transceiver and configured to:
receive, from a terminal, a service request message including uplink status information over one access among a 3rd generation partnership project (3GPP) access and a non-3GPP access which are associated with a multi-access (MA) protocol data unit (PDU) session, the uplink status information indicating the MA PDU session associated with the one access having pending uplink data, and
transmit, to the terminal, a service accept message including information on a reactivation result of a user plane resource of the MA PDU session for the one access, based on the uplink status information,
wherein, in case that the information on the reactivation result indicates a failure for reactivation of the user plane resource, the service accept message further includes information on an error cause of the failure, and
wherein the error cause indicates insufficient resources for a specific slice.

11. The AMF of claim 10, wherein:
in case that the user plane resource of the MA PDU session is associated with the 3GPP access, the service request message is received over the 3GPP access, and
in case that the user plane resource of the MA PDU session is associated with the non-3GPP access, the service request message is received over the non-3GPP access.

12. The AMF of claim 10, wherein the uplink status information indicates that the MA PDU session has uplink data pending to be sent.

* * * * *